(12) United States Patent
Sahu et al.

(10) Patent No.: US 10,614,603 B2
(45) Date of Patent: Apr. 7, 2020

(54) COLOR NORMALIZATION FOR A MULTI-CAMERA SYSTEM

(71) Applicant: QUALCOMM Incorporated, San Diego, CA (US)

(72) Inventors: Shilpi Sahu, Bangalore (IN); Chiranjib Choudhuri, Bangalore (IN); Pawan Kumar Baheti, Bangalore (IN); Ajit Deepak Gupte, Bangalore (IN)

(73) Assignee: Qualcomm Incorporated, San Diego, CA (US)

( * ) Notice: Subject to any disclaimer, the term of this patent is extended or adjusted under 35 U.S.C. 154(b) by 299 days.

(21) Appl. No.: 15/473,038

(22) Filed: Mar. 29, 2017

(65) Prior Publication Data
US 2018/0082454 A1    Mar. 22, 2018

Related U.S. Application Data

(60) Provisional application No. 62/396,715, filed on Sep. 19, 2016.

(51) Int. Cl.
*G06T 11/60* (2006.01)
*G06T 3/40* (2006.01)
(Continued)

(52) U.S. Cl.
CPC .......... *G06T 11/60* (2013.01); *G06T 3/4038* (2013.01); *G06T 5/002* (2013.01); *G06T 5/20* (2013.01);
(Continued)

(58) Field of Classification Search
CPC ......... G06T 11/60; G06T 3/4038; G06T 7/90; G06T 5/40; G06T 5/20; G06T 5/002;
(Continued)

(56) References Cited

U.S. PATENT DOCUMENTS

| | | | |
|---|---|---|---|
| 5,544,258 A | * | 8/1996 | Levien ............... G06T 5/009 358/448 |
| 8,179,363 B2 | | 5/2012 | Kerofsky |

(Continued)

OTHER PUBLICATIONS

Arici T., et al., "A Histogram Modification Framework and Its Application for Image Contrast Enhancement", IEEE Transactions on Image Processing, IEEE Service Center, Piscataway, NJ, US, vol. 18, No. 9, Sep. 1, 2009, pp. 1921-1935, XP011268498.
(Continued)

*Primary Examiner* — Menatoallah Youssef
(74) *Attorney, Agent, or Firm* — Shumaker & Sieffert, P.A.

(57) ABSTRACT

Techniques are described in which a device is configured to determine an overlap region between a first image and a second image, determine a first histogram based on color data included in the first image that corresponds to the overlap region, and determine a second histogram based on color data included in the second image that corresponds to the overlap region. The processor is further configured to determine, based on the first and second histograms, a mapping function that substantially maps the second histogram to the first histogram and apply the mapping function to the second image to generate a normalized second image with respect to the first image.

19 Claims, 24 Drawing Sheets

(51) Int. Cl.
| | |
|---|---|
| *H04N 5/232* | (2006.01) |
| *H04N 9/69* | (2006.01) |
| *G06T 7/90* | (2017.01) |
| *G06T 5/00* | (2006.01) |
| *G06T 5/20* | (2006.01) |
| *G06T 5/40* | (2006.01) |
| *H04N 7/18* | (2006.01) |

(52) U.S. Cl.
CPC .................. *G06T 5/40* (2013.01); *G06T 7/90* (2017.01); *H04N 5/23238* (2013.01); *H04N 7/181* (2013.01); *H04N 9/69* (2013.01); *G06T 2207/10024* (2013.01)

(58) Field of Classification Search
CPC ............ G06T 2207/10024; H04N 9/69; H04N 5/23238; H04N 7/181
See application file for complete search history.

(56) References Cited

U.S. PATENT DOCUMENTS

| | | |
|---|---|---|
| 8,933,985 B1 | 1/2015 | Rapaport et al. |
| 8,958,658 B1 | 2/2015 | Lim et al. |
| 8,965,121 B2 | 2/2015 | McNamer |
| 9,077,943 B2 | 7/2015 | Lim et al. |
| 9,589,350 B1 * | 3/2017 | Kozko ............... H04N 5/23238 |
| 9,838,614 B1 * | 12/2017 | Brailovskiy .......... G06T 3/4038 |
| 2005/0088534 A1 * | 4/2005 | Shen .................... H04N 1/3876 348/218.1 |
| 2011/0150329 A1 | 6/2011 | Lepine et al. |
| 2016/0155219 A1 | 6/2016 | Shigemura et al. |

OTHER PUBLICATIONS

International Search Report and Written Opinion—PCT/US2017/045725—ISA/EPO—dated Oct. 13, 2017 (16 pp).

Maojun Z., et al., "Color Histogram Correction for Panoramic Images", Proceedings of Seventh International Conference on Virtual Systems and Multimedia, Berkeley, CA, Oct. 25, 2001, pp. 328-331, XP010567097.

Milgram D.L., "Computer Methods for Creating Photomosaics", IEEE Transactions on Computers, C-24(11), Nov. 1975, pp. 1113-1119.

International Preliminary Report on Patentability—PCT/US20171045725, The International Bureau of WIPO—Geneva, Switzerland, dated Nov. 2, 2018 (31 pp).

Response to Written Opinion from corresponding PCT Application Serial No. PCT/US2017/045725 filed on Jun. 26, 2018 (22 pp).

Second Written Opinion from corresponding PCT Application Serial No. PCT/US2017/045725 dated Aug. 2, 2018 (8 pp).

Xiong et al., "Color Matching of Image Sequences with Combined Gamma and Linear Corrections", International Conference on ACM Multimedia, Oct. 25-29, 2010, 10 pp.

* cited by examiner

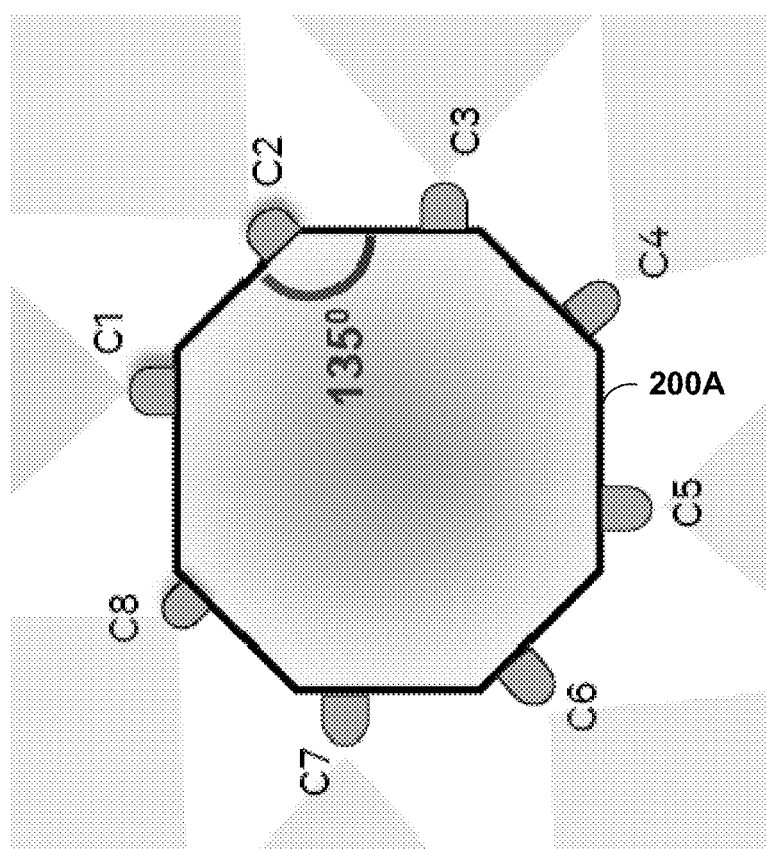

COLOR NORMALIZATION FOR A MULTI-CAMERA SYSTEM

This application claims the benefit of U.S. Provisional Application No. 62/396,715, filed Sep. 19, 2016, the entire content of which is incorporated by reference herein.

TECHNICAL FIELD

This disclosure relates to image generation and more particularly to image generation using multiple images that are captured from multiple cameras.

BACKGROUND

Images from each camera of a multi-camera system may be stitched together to form a stitched image, for instance, a 360-degree image. Such stitched images can be recorded or streamed live, for instance, on a head mounted device. However, a mismatch between camera optics of a multi-camera system may result in inconsistency across a stitched image, particularly at boundaries between images used to form the stitched image.

SUMMARY

This disclosure describes example techniques by which, after content capture by cameras of a multi-camera system, post processing techniques compensate for a mismatch between cameras of the multi-camera system. Rather than simply matching a mean luminance of overlap regions, the techniques may be used to normalize histograms of images captured by different cameras and/or identify binned luminance correspondences between overlapping regions. In this manner, a resulting stitched image may have less contouring artifacts and improved normalization between different stitched images.

In one example, a device includes a processor comprising integrated circuitry, the processor configured to determine an overlap region between a first image and a second image, determine a first histogram based on color data included in the first image that corresponds to the overlap region, and determine a second histogram based on color data included in the second image that corresponds to the overlap region. The processor is further configured to determine, based on the first and second histograms, a mapping function that substantially maps the second histogram to the first histogram and apply the mapping function to the second image to generate a normalized second image with respect to the first image.

In one example, a method includes determining an overlap region between a first image and a second image, determining a first histogram based on color data included in the first image that corresponds to the overlap region, and determining a second histogram based on color data included in the second image that corresponds to the overlap region. The method further includes determining, based on the first and second histograms, a mapping function that substantially maps the second histogram to the first histogram and applying the mapping function to the second image to generate a normalized second image with respect to the first image.

In another example, a non-transitory computer-readable storage medium storing instructions that when executed cause one or more processors to determine an overlap region between a first image and a second image and determine a first histogram based on color data included in the first image that corresponds to the overlap region. The one or more processors are further caused to determine a second histogram based on color data included in the second image that corresponds to the overlap region, determine, based on the first and second histograms, a mapping function that substantially maps the second histogram to the first histogram, and apply the mapping function to the second image to generate a normalized second image with respect to the first image.

The details of one or more examples are set forth in the accompanying drawings and the description below. Other features, objects, and advantages will be apparent from the description, drawings, and claims.

BRIEF DESCRIPTION OF THE DRAWINGS

FIG. 2A is an illustration of a multi-camera system to perform one or more example techniques described in this disclosure.

DETAILED DESCRIPTION

Figure 1:
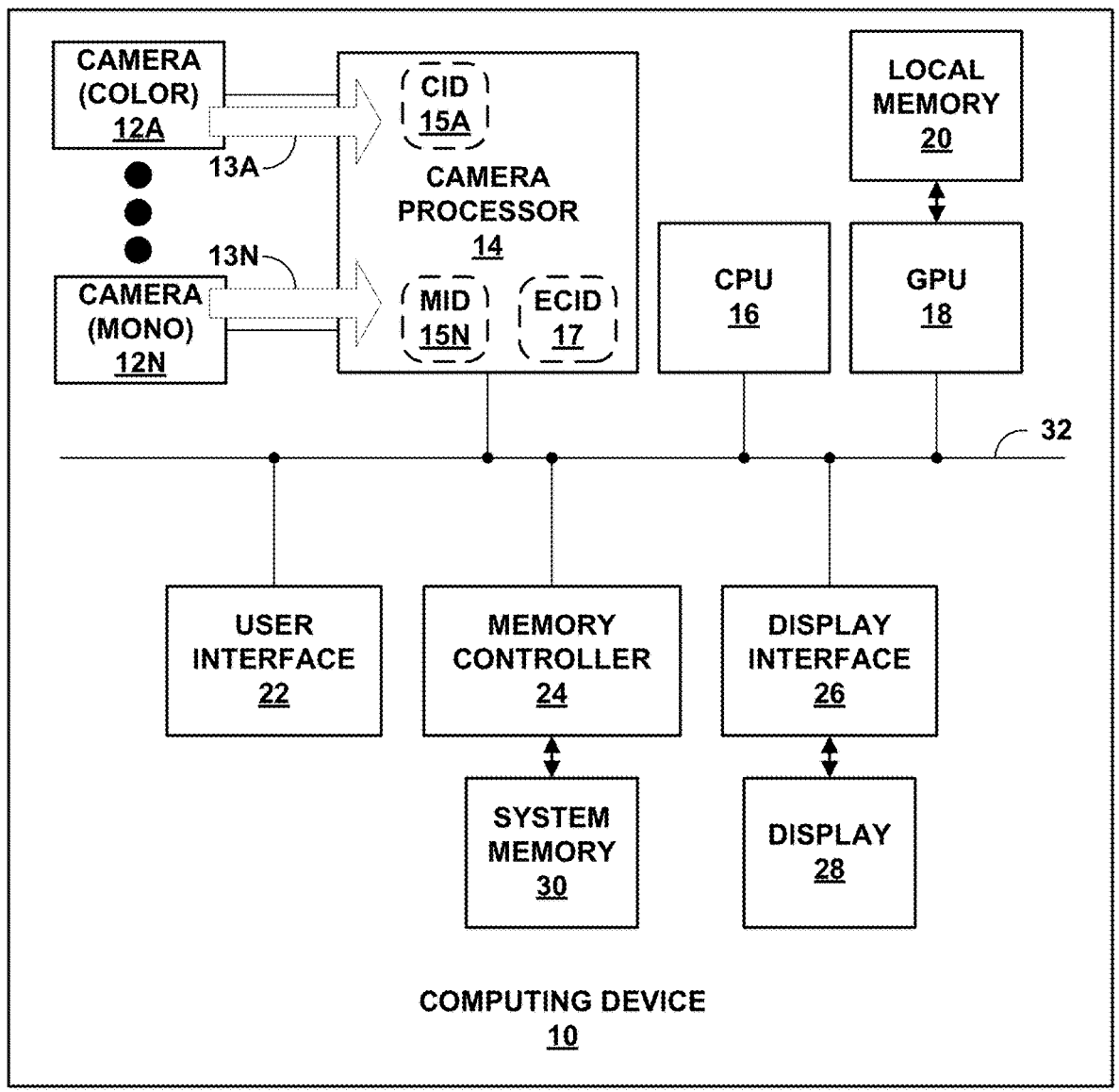
FIG. 1 is a block diagram of a computing device for image processing configured to perform one or more example techniques described in this disclosure.

Multi-camera systems may effectively capture an image in 360 degrees, and prepare stitched image or video content which can be recorded and/or streamed live to users (e.g., on a head mounted display (HMD)). Different cameras with different exposure and/or white balance control may capture images using different settings (e.g., luminance sensitivity, color saturation, etc.), especially when all camera front-ends are not on a common processor. Even when the auto-exposure and/or auto white balance (AE/AWB) is done globally, for instance, where determining different light conditions and illuminants would have been possible, the challenge may still remain to achieve brightness and/or color consistency across all stitched images. The techniques of this disclosure may be used to achieve luminance and color consistency in a canvas stitched from images captured by different cameras. In some examples herein, a fixed focus (e.g., at infinity) is assumed for all cameras of a multi-camera system.

Some techniques may use products (e.g., in a prototyping stage) with multiple (e.g., more than 6) cameras. However, some systems fail to compensate for a differences in the multiple cameras, thereby resulting in imperfections in color quality. In some examples, commercial products with two cameras may capture two separate images and blend the images across seams between the images, where the "seam" corresponds to a line at the boundary of an overlapping region between the two captured images. As a result, ghosting effects may be seen. Some algorithms (e.g., multi-camera color alignment) may include local blending and mean gamma correction.

Local blending may include blending linearly from a first camera to a second camera to transition smoothly across the seam from an image captured by the first camera to an image captured by the second camera. While local blending may be a simple approach, local blending may suffer from ghosting artifacts when an object in foreground in motion spans across the seam and brightness/color differences between the cameras may remain, such that only the transition becomes smoother.

Mean gamma correction of overlapped regions may include color matching of image sequences with combined gamma and linear corrections. While mean gamma correction may bridge brightness differences between frames to a certain extent, mean gamma correction may not represent variations within a scene (e.g., such as in FIG. 2D). Accordingly, mean gamma correction may not address mismatches between images captured by different cameras in an appropriate manner.

In some techniques, rather than merely smoothing a blending between images captured by different cameras or reducing a mean brightness difference between the images captured by different cameras, a multi-camera system may perform histogram normalization techniques for adjacent images. For example, a processor of a multi-camera system may create, using histogram normalization techniques, a mapping that normalizes pixel values in an overlap region between first and second images, and apply the mapping to the entire second image. Moreover, in some examples, a multi-camera system may perform a smoothing function (e.g., low pass filtering) on target and source cumulative histograms before applying any mapping. For instance, a processor of a multi-camera system may apply a low pass filter function on a target cumulative histogram for the first image and/or apply a low pass filter function on a source cumulative histogram for the second image before creating a mapping that normalizes pixel values between the first and second images. Multi-camera systems may apply the smoothing function to reduce abrupt pixel value mappings and remove additional contouring artifacts in the resulting normalized image compared with multi-camera systems that omit a smoothing function. In this manner, differences in the multiple cameras used to capture an image in 360 degrees, may be reduced, thereby resulting in a stitched image having reduced ghosting artifacts while also minimizing brightness and color differences between different images in the stitched image.

Additionally, or alternatively, in some techniques, rather than merely normalizing a single mean brightness (e.g., a luminance component) difference between the entire images captured by different cameras, a multi-camera system may normalize a mean brightness difference for each bin of pixel values between the images captured by different cameras. Multi-camera systems configured to normalize a mean brightness difference for each grouping (e.g., bin) of similar colors of a pair of images may thereby further normalize a color mismatch between the pair of images than multi-camera systems configured to reduce a single mean brightness difference in all colors (e.g., bins) of the pair of images.

Moreover, in some examples, a bin may be defined dynamically (e.g., for each pair of images captured by different cameras) such that a bin boundary is defined at flat regions in an image cumulative distribution function (CDF). For instance, a multi-camera system may dynamically determine bin boundaries according to a CDF of the images captured such that similar color pixel values will be placed together in a single bin and different color pixel values will be placed separately in different bins. In this manner, differences in cameras used to capture an image in 360 degrees may be reduced, thereby resulting in a stitched image having reduced ghosting artifacts while normalizing brightness and color differences between different images in the stitched image compared with multi-camera systems configured to reduce a single mean brightness difference in all colors of the different images.

FIG. 1 is a block diagram of a computing device 10 for image processing configured to perform one or more example techniques described in this disclosure. Examples of computing device 10 include a personal computer, a desktop computer, a laptop computer, a computer workstation, a video game platform or console, a wireless communication device (such as, e.g., a mobile telephone, a cellular telephone, a satellite telephone, and/or a mobile telephone handset), a landline telephone, an Internet telephone, a handheld device such as a portable video game device or a personal digital assistant (PDA), a personal music player, a video player, a display device, a standalone camera, a television, a television set-top box, a server, an intermediate network device, a mainframe computer or any other type of device that includes a camera to capture photos or other types of image data.

As illustrated in the example of FIG. 1, computing device 10 includes a plurality of cameras 12A-12N (e.g., four cameras or nine cameras as two examples), at least one camera processor 14, a central processing unit (CPU) 16, a graphical processing unit (GPU) 18 and local memory 20 of GPU 18, user interface 22, memory controller 24 that provides access to system memory 30, and display interface 26 that outputs signals that cause graphical data to be displayed on display 28.

Also, although the various components are illustrated as separate components, in some examples the components may be combined to form a system on chip (SoC). As an example, camera processor 14, CPU 16, GPU 18, and display interface 26 may be formed on a common chip. In some examples, one or more of camera processor 14, CPU 16, GPU 18, and display interface 26 may be in separate chips.

The various components illustrated in FIG. 1 may be formed in one or more microprocessors, application specific integrated circuits (ASICs), field programmable gate arrays (FPGAs), digital signal processors (DSPs), or other equivalent integrated or discrete logic circuitry. Examples of local memory 20 include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), flash memory, a magnetic data media or an optical storage media.

The various units illustrated in FIG. 1 communicate with each other using bus 32. Bus 32 may be any of a variety of bus structures, such as a third generation bus (e.g., a HyperTransport bus or an InfiniBand bus), a second generation bus (e.g., an Advanced Graphics Port bus, a Peripheral Component Interconnect (PCI) Express bus, or an Advanced eXtensible Interface (AXI) bus) or another type of bus or device interconnect. It should be noted that the specific configuration of buses and communication interfaces between the different components shown in FIG. 1 is merely exemplary, and other configurations of computing devices and/or other image processing systems with the same or different components may be used to implement the techniques of this disclosure.

As illustrated, computing device 10 includes cameras 12A-12N. Cameras 12A-12N need not necessarily be part of computing device 10 and may be external to computing device 10. In such examples, camera processor 14 may similarly be external to computing device 10; however, it may be possible for camera processor 14 to be internal to computing device 10 in such examples. For ease of description, the examples are described with respect to cameras 12A-12N and camera processor 14 being part of computing device 10 (e.g., such as in examples where computing device 10 is a mobile device such as a smartphone, tablet computer, or the like).

Cameras 12A-12N as used in this disclosure may each capture separate sets of pixels (e.g., camera 12A captures a first set of pixels, camera 12B captures a second set of pixels, and so forth). In some examples, each one of cameras 12A-12N includes a plurality of sensors, and each sensor is configured to capture one or more pixels. For example, each sensor captures three pixels (e.g., a pixel for red, a pixel for green, and a pixel for blue). As another example, each sensor captures four pixels (e.g., a pixel for red, two pixels for green used to determine the green intensity and overall luminance, a pixel for blue as arranged with a Bayer filter). Even in examples where cameras 12A-12N include a plurality of sensors that captures a plurality of pixels, cameras 12A-12N may each capture a plurality of pixels. Other naming conventions may be used. For example, computing device 10 may be considered as including one camera, and cameras 12A-12N are respectively called sensors instead of cameras or sub-cameras. The techniques described in this disclosure are applicable to all of these examples.

Regardless of the specific naming convention, each of cameras 12A-12N may capture image content to generate one stitched image. Generating a stitched image from two or more images may include concatenating the two or more images such that a resulting stitched image appears to be a single and continuous image. In some examples, generating the stitched image may include determining overlapping regions of the two or more images and aligning the two or more images to form a single and continuous image. Each one of these images may be combined to generate a higher resolution image. However, in some examples, there may be sufficient resolution from any one of the images captured by cameras 12A-12N for display.

Each one of cameras 12A-12N may include its own aperture and lens. However, the techniques are not so limited. In some examples, there may be a common aperture and/or lens for cameras 12A-12N and an optical splitter and waveguide that transmits the captured light to respective ones of 12A-12N. Other configurations are possible and contemplated by the techniques described in this disclosure.

In some examples, the pixels of cameras 12A-12N may be covered with red-green-blue (RGB) color filters in accordance with a Bayer filter. With Bayer filtering, each of the pixels may receive light energy for a particular color component (e.g., red, green, or blue). Accordingly, the current generated by each pixel is indicative of the intensity of red, green, or blue color components in the captured light.

Camera processor 14 is configured to receive the electrical currents from respective pixels of cameras 12A-12N and process the electrical currents to generate an image. Although one camera processor 14 is illustrated, in some examples, there may be a plurality of camera processors (e.g., one per cameras 12A-12N). Accordingly, in some examples, there may be one or more camera processors like camera processor 14 in computing device 10.

In some examples, camera processor 14 may be configured as a single-input-multiple-data (SIMD) architecture. Camera processor 14 may perform the same operations on current received from each of the pixels on each of cameras 12A-12N. Each lane of the SIMD architecture includes an image pipeline. The image pipeline includes hardwire circuitry and/or programmable circuitry to process the output of the pixels.

For example, each camera processor 14 may include respective trans-impedance amplifiers (TIAs) to convert the current to a voltage and respective analog-to-digital converters (ADCs) that convert the analog voltage output into a digital value. In the example of the visible spectrum, because the current outputted by each pixel indicates the intensity of a red, green, or blue component, the digital values from three pixels of one of cameras 12A-12N (e.g., digital values from one sensor that includes three or four pixels) can be used to generate one image pixel.

In addition to converting analog current outputs to digital values, camera processor 14 may perform some additional post-processing to increase the quality of the final image. For example, camera processor 14 may evaluate the color and brightness data of neighboring image pixels and perform demosaicing to update the color and brightness of the image pixel. Camera processor 14 may also perform noise reduction and image sharpening, as additional examples. Camera processor 14 outputs the resulting images (e.g., pixel values for each of the image pixels) to system memory 30 via memory controller 24.

CPU 16 may comprise a general-purpose or a special-purpose processor that controls operation of computing device 10. A user may provide input to computing device 10 to cause CPU 16 to execute one or more software applications. The software applications that execute on CPU 16 may include, for example, an operating system, a word processor application, an email application, a spread sheet application, a media player application, a video game application, a graphical user interface application or another program. The user may provide input to computing device 10 via one or more input devices (not shown) such as a keyboard, a mouse, a microphone, a touch pad or another input device that is coupled to computing device 10 via user input interface 22.

As one example, the user may execute an application to capture an image. The application may present real-time image content on display 28 for the user to view prior to taking an image. In some examples, the real-time image content displayed on display 28 may be the content from one of cameras 12A-12N. The code for the application used to capture image may be stored on system memory 30 and CPU 16 may retrieve and execute the object code for the application or retrieve and compile source code to obtain object code, which CPU 16 may execute to present the application.

When the user is satisfied with the real-time image content, the user may interact with user interface 22 (which may be a graphical button displayed on display 28) to capture the image content. In response, one or more cameras 12A-12N may capture image content and camera processor 14 may process the received image content to generate a plurality of images. In some examples, rather than cameras 12A-12N capturing images in all cases, the application executing on CPU 16 may output via display 28 an option for the user to select high resolution image generation. In response, each one of cameras 12A-12N would capture images. If high resolution image generation is not selected, one of cameras 12A-12N captures image content. Alternatively, all cameras 12A-12N may capture images in all instances. However, camera processor 14 may not process the resulting content from all cameras 12A-12N in all instances.

Memory controller 24 facilitates the transfer of data going into and out of system memory 30. For example, memory controller 24 may receive memory read and write commands, and service such commands with respect to memory 30 in order to provide memory services for the components in computing device 10. Memory controller 24 is communicatively coupled to system memory 30. Although memory controller 34 is illustrated in the example computing device 10 of FIG. 1 as being a processing module that is separate from both CPU 16 and system memory 30, in other examples, some or all of the functionality of memory controller 24 may be implemented on one or both of CPU 46 and system memory 30.

System memory 30 may store program modules and/or instructions and/or data that are accessible by camera processor 14, CPU 16, and GPU 18. For example, system memory 30 may store user applications, resulting images from camera processor 14, intermediate data, and the like. System memory 30 may additionally store information for use by and/or generated by other components of computing device 10. For example, system memory 30 may act as a device memory for camera processor 14. System memory 30 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), flash memory, a magnetic data media or an optical storage media.

In some aspects, system memory 30 may include instructions that cause camera processor 14, CPU 16, GPU 18, and display interface 26 to perform the functions ascribed to these components in this disclosure. Accordingly, system memory 30 may represent a computer-readable storage medium having instructions stored thereon that, when executed, cause one or more processors (e.g., camera processor 14, CPU 16, GPU 18, and display interface 26) to perform various aspects of the techniques described in this disclosure.

In some examples, system memory 30 may represent a non-transitory computer-readable storage medium. The term "non-transitory" indicates that the storage medium is not embodied in a carrier wave or a propagated signal. However, the term "non-transitory" should not be interpreted to mean that system memory 30 is non-movable or that its contents are static. As one example, system memory 30 may be removed from computing device 10, and moved to another device. As another example, memory, substantially similar to system memory 30, may be inserted into computing device 10. In certain examples, a non-transitory storage medium may store data that can, over time, change (e.g., in RAM).

Camera processor 14, CPU 16, and GPU 18 may store image data, and the like in respective buffers that are allocated within system memory 30. Display interface 26 may retrieve the data from system memory 30 and configure display 28 to display the image represented by the rendered image data. In some examples, display interface 26 may include a digital-to-analog converter (DAC) that is configured to convert the digital values retrieved from system memory 30 into an analog signal consumable by display 28. In other examples, display interface 26 may pass the digital values directly to display 28 for processing.

Display 28 may include a monitor, a television, a projection device, a liquid crystal display (LCD), a plasma display panel, a light emitting diode (LED) array, a cathode ray tube (CRT) display, electronic paper, a surface-conduction electron-emitted display (SED), a laser television display, a nanocrystal display or another type of display unit. Display 28 may be integrated within computing device 10. For instance, display 28 may be a screen of a mobile telephone handset or a tablet computer. Alternatively, display 28 may be a stand-alone device coupled to computing device 10 via a wired or wireless communications link. For instance, display 28 may be a computer monitor or flat panel display connected to a personal computer via a cable or wireless link.

In accordance with the techniques described in this disclosure, computing device 10 may enhance a color photo based on a monochrome (which may be shortened to "mono") photo captured concurrent to the capture of the color photo. In the example of FIG. 1, camera 12A is assumed to represent a color camera 12A, while camera 12N is assumed to represent a mono camera 12N. As such, computing device 10 may include both a color camera 12A and a mono camera 12N. Color camera 12A may be displayed (e.g., horizontally displaced or vertically displaced) physically within the housing of computing device 10 from mono camera 12N.

In operation, mono camera 12N of computing device 10 may capture a mono photo (where the term photo may refer to "image data") of a scene. Color camera 12A may capture color image data 13A of the same scene concurrent with the capture of monochrome image data 13N by monochrome camera 12N. Camera processor 14 may coordinate the concurrent capture of color image data 13A and mono image data 13N by initiating each of color camera 12A and mono camera 12N concurrently to capture the scene at approximately the same time (which may not be exactly the same time due to signal latency, processing latency, or other types of latencies or delays but should be sufficiently close in time so as to capture substantially the same content).

In some instances, camera processor 14 may initiate the capture of multiple different color image data 13A and/or multiple different mono image data 13N over a period of time and perform so-called frame average or other summation techniques to produce an image from multiple images captured over a short period of time. Camera processor 14 may process multiple different color image data 13A and/or multiple different mono image data 13N to generate a single combined color image data 15A ("CID 15A") and/or a single combined mono image data 15N ("MID 15N"). Camera processor 14 may, for example, average the corresponding pixel values for each pixel specified in multiple different color image data 13A on a pixel-by-pixel basis to generate single combined color image data 15A. Likewise, camera processor 14 may average the corresponding pixel values for each pixel specified in multiple different mono image data 13N on a pixel-by-pixel basis to generate single combined mono image data 15N.

Camera processor 14 may utilize single combined color image data 15A and/or single combined color image data 15N in place of single color image data 13A and/or single mono image data 13N noted above in the various aspects of the techniques described in this disclosure. Although camera processor 14 may operate with respect to any combination of single color image data 13A, single mono image data 13N, single combined color image data 15A, and single combined mono image data 15N, camera processor 14 is described below, for ease of illustration purposes, as operating with respect to single combined color image data 15A and single combined mono image data 15N except for when discussing the photographic results of utilizing single color image data 13A and single mono image data 13N.

In any event, camera processor 14 processes combined color image data 15A based on combined mono image data 15N to generate enhanced color image data 17 ("ECID 17"). The overall operation of camera processor 14 in processing combined color image data 15A based on combined mono image data 15N is described in more detail with respect to FIGS. 2-23.

FIG. 2A is a first illustration of a multi-camera system 200A to perform one or more example techniques described in this disclosure. FIG. 2A is discussed with respect to computing device 10 of FIG. 1 for exemplary purposes only. In the example of FIG. 2A, multi-camera system 200A is discussed as including eight cameras C1-C8. However, multi-camera system 200A may include fewer cameras (e.g., less than 8) or more cameras (e.g., more than 9). In some examples, each camera of cameras C1-C8 may be an example of device 10 of FIG. 1. A brightness and/or color tone setting between cameras C1-C8 may be different, which may result in a mismatch between captures by cameras C1-C8. Said differently, cameras C1-C8 may point in different directions and may have independent settings that result in a mismatch between image and/or video captured by cameras C1-C8. For instance, cameras C1-C8 may have different settings, such as auto-exposure and auto white balance, that may cause cameras C1-C8 to capture videos and/or images that appear different. For instance, camera C1 may capture a first image using a brightness and/or tone setting that is different from camera C2, camera C3 may capture a third image using a brightness and/or tone setting that is different from camera C2, and so on. To create an immersive or panoramic view, multi-camera system 200A (e.g., a processor, CPU 16, or other processor circuitry) may match images captured by cameras C1-C8 before they are merged together so that the stitching boundaries are not visible and the consumer of the image and/or video may have an immersive experience, for instance, through a head mounted device.

Figure 2B:
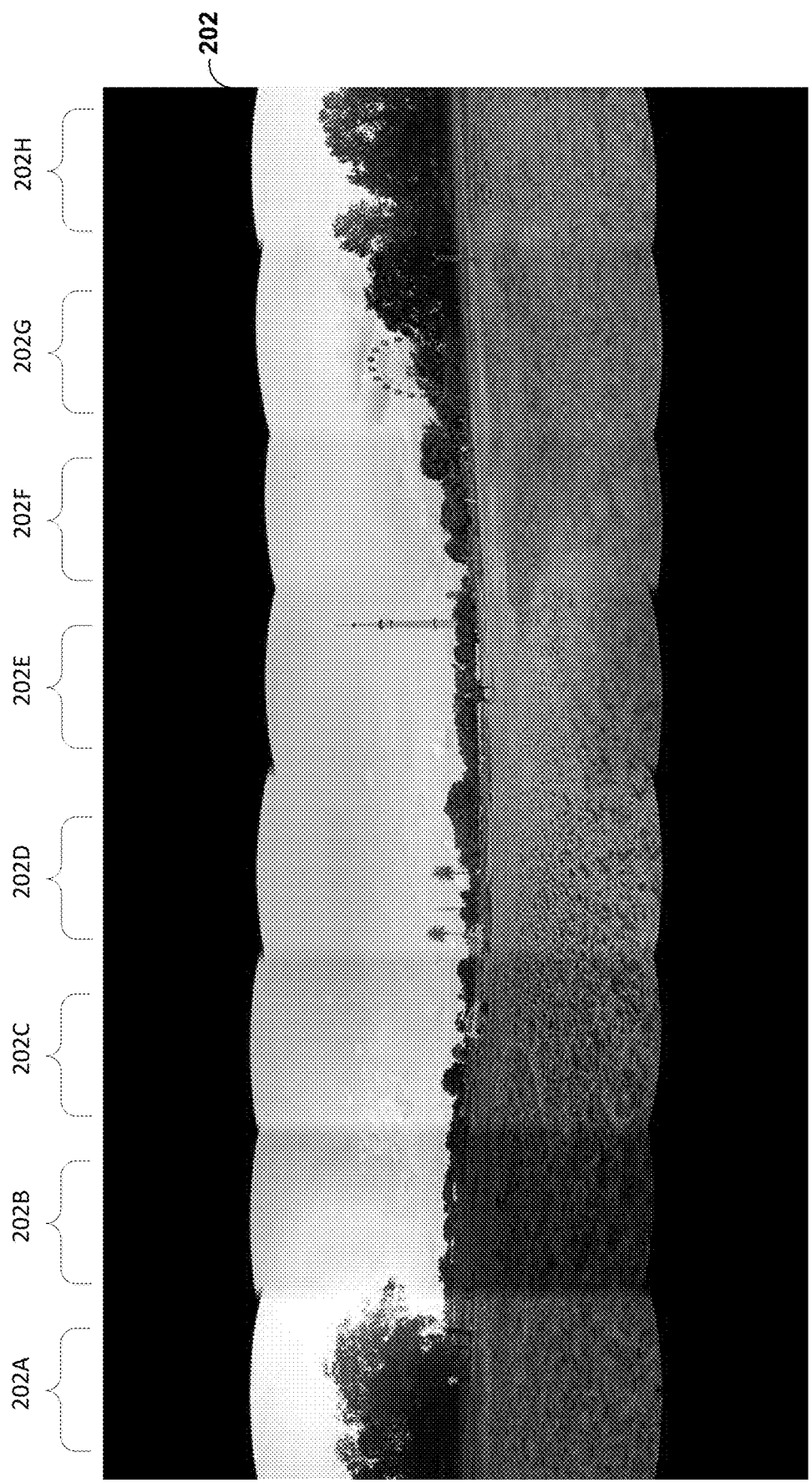
FIG. 2B is an example stitched image using images from a multi-camera system in accordance with one or more example techniques described in this disclosure.

FIG. 2B is an example stitched image 202 using images from a multi-camera system. As shown, stitched image 202 may include images 202A-H. For instance, image 202A may be captured by C1 of FIG. 2A, image 202B may be captured by C2 of FIG. 2A, image 202C may be captured by C3 of FIG. 2A. and so forth. However, as illustrated in FIG. 2B, image 202B has a visibly different brightness and tone than images 202A and 202C. In the example, the different brightness is caused by different brightness and/or tone settings of a camera capturing image 202B (e.g., camera C2) relative to brightness and/or tone settings of cameras (e.g., C1 and C3) capturing images 202A and C. As such, it is desirable to account for different settings in cameras capturing images used for stitched image 202 such that stitch image 202 appears to have been captured by a single camera.

Figure 3:
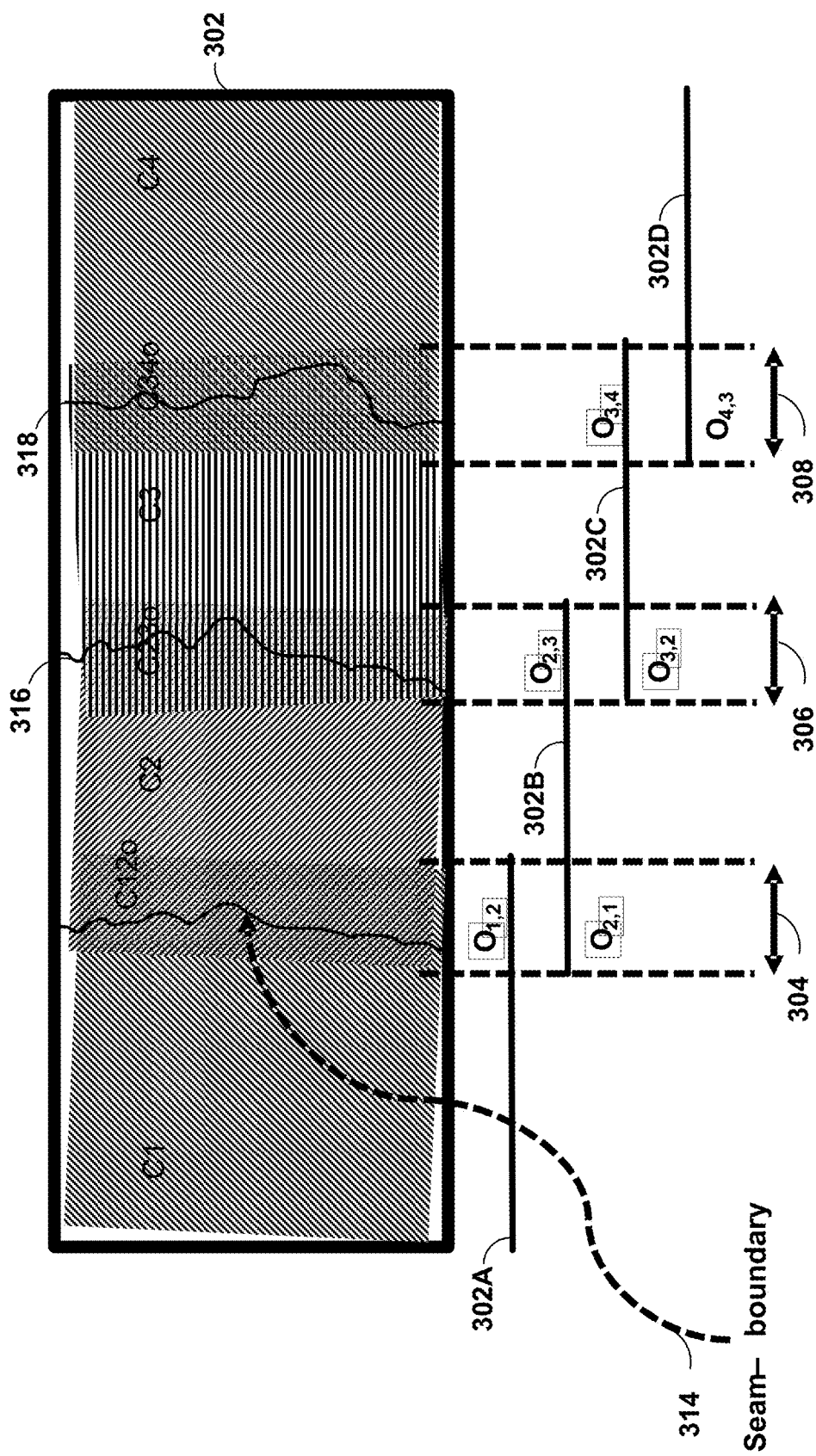
FIG. 3 is a diagram of a stitched image using images from a multi-camera system in accordance with one or more example techniques described in this disclosure.

FIG. 3 is a diagram of a stitched image 302 using images 302A-D from a multi-camera system. FIG. 3 is discussed with respect to computing device 10 of FIG. 1, and multi-camera system 200A of FIG. 2A for exemplary purposes only. In the example of FIG. 3, images 302A and B form overlap region 304, images 302B and C form overlap region 306, and images 302C and D form overlap region 306. As shown, seam 314 divides overlap region 304, seam 316 divides in overlap region 306, and seam 318 divides overlap region 308. In the example of FIG. 3, image 302A may be captured by C1 of FIG. 2A, image 302B may be captured by C2 of FIG. 2A, image 302C may be captured by C3 of FIG. 2A, and image 302D may be captured by C4 of FIG. 2A. In the example of FIG. 3, seams 314-318 are visible due to different brightness and/or tone settings of a camera capturing images 302A-D (e.g., cameras C1-4).

Figure 4:
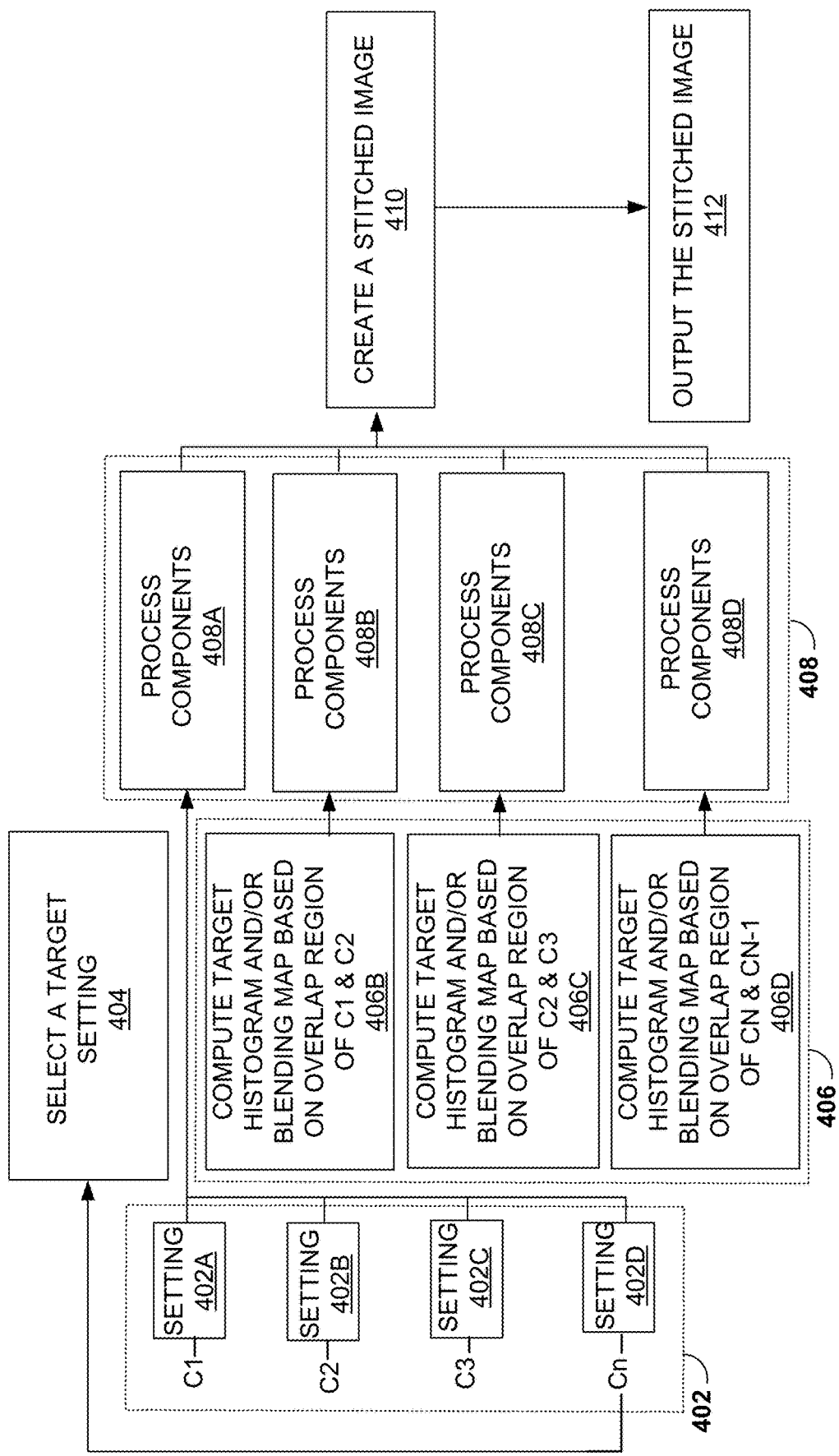
FIG. 4 is a flowchart illustrating exemplary operation of the device of FIG. 1 in performing various aspects of stitching techniques described in this disclosure.

FIG. 4 is a flowchart illustrating exemplary operation of the device of FIG. 1 in performing various aspects of stitching techniques described in this disclosure. FIG. 4 is discussed with respect to computing device 10 of FIG. 1, multi-camera system 200A of FIG. 2A, stitched image 202 of FIG. 2B, and stitched image 302 of FIG. 3 for exemplary purposes only.

In the example of FIG. 4, cameras C1-Cn capture images using independently configured settings (402). For instance, camera C1 may have a brightness and/or tone setting that is different than camera C2. Multi-camera system 200A may select a target setting from cameras C1-Cn (404). For example, multi-camera system 200A may select a setting from camera Cn as the target setting based on a dominant illuminant across cameras C1-Cn. As used herein, a dominant illuminant may refer to a white point occurs most frequently. For instance, multi-camera system 200A may select a target auto white balance (AWB) setting from camera Cn when a AWB settings for camera Cn result in the dominant illuminant occurring in an image captured by camera Cn at a higher occurrence than in images 202A-202H.

Multi-camera system 200A may compute a target histogram and/or blending map for Cn based on overlap region of Cn and Cn−1. For example, multi-camera system 200A may compute a target histogram and/or blending map based on overlap regions (406). As shown, multi-camera system 200A may compute a first target histogram and/or blending map according overlap region 304 (406B), compute a second target histogram and blending map according overlap region 306 (406C), compute a third target histogram and/or blending map according overlap region 308 (406D).

Multi-camera system 200A may process components of images captured based on the computed targeted histogram and blending maps (408). For example, multi-camera system 200A may process components in image 202A (408A), process components in image 202B (408B), process components in image 202C (408C), and process components in image 202D (408D). Examples of process components may include, but are not limited to, undistort, spherically project, perspective transform, color correct, or other process components.

Some processing techniques may include matching a brightness difference between various panorama component images by successively propagating individual pixel value maps among the camera captures. For example, multi-camera system 200A may create a stitched image (e.g., a 360 canvas) by matching a brightness difference between images 302A and B, then matching a brightness difference between images 302B and C, then matching a brightness difference between images 302C and D, and so on.

In some examples, features (e.g., histogram attributes) may be shared across neighboring cameras and/or image signal processors (ISPs). For example, multi-camera system 200A may cause camera processor 14 of each of cameras C1-Cn to share an AWB setting.

Multi-camera system 200A may create a stitched image (e.g., a 360 canvas) (410). For example, multi-camera system 200A may blend across frames at seams 314-318. Multi-camera system 200A may output the stitched image (412). For example, Multi-camera system 200A may initiate an encoding of the stitched image, cause the (encoded) stitched image to be transmitted to another device and/or cause the (encoded) stitched image to be stored.

Figure 5:
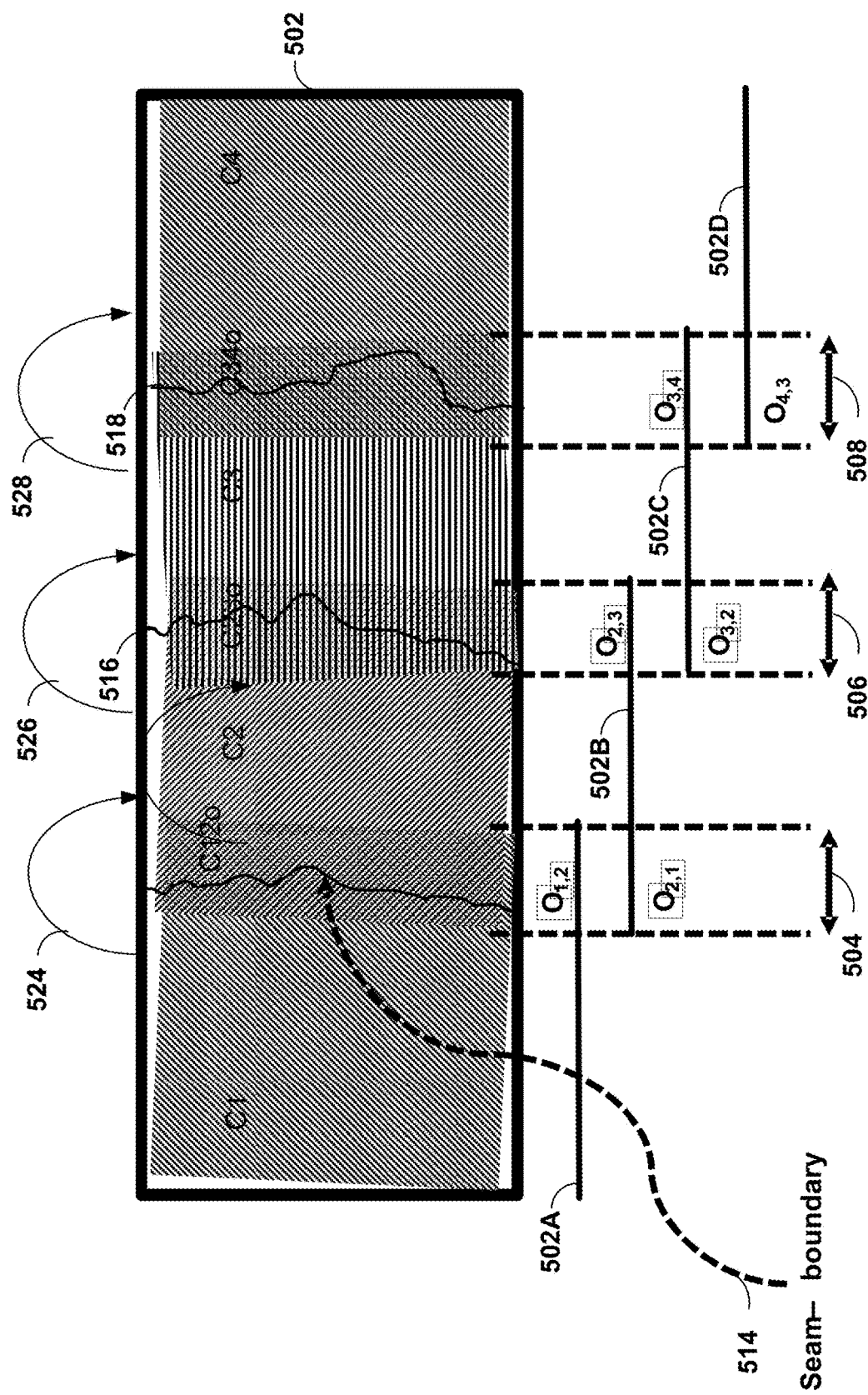
FIG. 5 is a diagram of a stitched image using one or more techniques of FIG. 4.

FIG. 5 is a diagram of a stitched image 502 using one or more techniques of FIG. 4. FIG. 5 is discussed with respect to computing device 10 of FIG. 1, multi-camera system 200A of FIG. 2A, and stitched image 202 of FIG. 2B for exemplary purposes only. In the example of FIG. 5, images 502A and B form overlap region 504, images 502B and C form overlap region 506, and images 502C and D form overlap region 506. As shown, seam 514 divides overlap region 504, seam 516 divides in overlap region 506, and seam 518 divides overlap region 508. In the example of FIG. 5, image 502A may be captured by C1 of FIG. 2A, image 502B may be captured by C2 of FIG. 2A, image 502C may be captured by C3 of FIG. 2A, and image 502D may be captured by C4 of FIG. 2A.

Multi-camera system 200A may perform a correction based on the pairwise overlap between the camera captures. For example, multi-camera system 200A may process image 502B based on overlap region 504, process image 502C based on overlap region 506, process image 502C based on overlap region 506, and process image 502D based on overlap region 506.

In some examples, for stitching an image (e.g., a video) there may be reasonable overlap (e.g., 30-50%) between adjacent cameras. This overlap region may be instrumental in finding and matching color heuristics of consecutive pairs. For example, multi-camera system 200A may match color heuristics of image 502B to image 502A (524). After matching the color heuristics of image 502B to image 502A, multi-camera system 200A may match color heuristics of image 502C to image 502B (526). After matching the color heuristics of image 502C to image 502B, multi-camera system 200A may match color heuristics of image 502D to image 502C (528). In this way, parameters computed over the common areas (e.g., overlap regions 504-508) may be applied to the rest of the camera images before stitching or merging.

Multi-camera system 200A may perform histogram normalization techniques in the red-green-blue (RGB) domain, YUV domain, only on the luminance Y (e.g., luma component) channel with R/G, B/G correction on color channels, or in another domain. For example, multi-camera system 200A may generate a histogram using luma components indicated in color data. In instances where multi-camera system 200 uses a YCbCr domain (e.g., Y is luma component, Cb is a blue-difference and Cr is a red-difference), multi-camera system 200 may perform histogram normalization techniques to the Y channel of the YCbCr domain. In instances where multi-camera system 200 uses a hue, saturation, and value (HSV) domain, multi-camera system 200 may perform histogram normalization techniques to the V (e.g., value) channel of the HSV domain. For example, multi-camera system 200A may normalize a histogram of image 502B to image 502A.

Multi-camera system 200A may generate a histogram based on color data that does not correspond to an overlap region. For example, rather than omitting color data for every pixel arranged outside overlap region 504 to generate histograms for normalizing image 502B to image 502A, multi-camera system 200A may apply a first weighting factor to color data included in image 502A that corresponds to overlap region 504 and apply a second weighting factor to color data included in image 502A that does not correspond to overlap region 504. More specifically, for example, multi-camera system 200A may apply the second weighting factor to color data included in image 502A that is positioned outside of overlap region 504. In some examples, the first weighting factor is greater than the second weighting factor. Additionally, or alternatively, multi-camera system 200A may apply a first weighting factor to color data included in image 502B that corresponds to overlap region 504 and apply a second weighting factor to color data included in image 502B that does not correspond to overlap region 504. In this manner, multi-camera system 200A may generate a histogram that provides an improved representation of an overall picture compared to systems that only use color data that corresponds to the overlap region, thereby resulting in fewer artifacts in a normalized image. Although the above examples used a single weighting factor for color data included in an image that corresponds to an overlap region and a single weighting factor for color data included in an image that does not correspond to the overlap region, it should be understood that multiple weighting factors may be used. For instance, multi-camera system 200A may apply a first set of weighting factors for color data included in image 502A that corresponds to overlap region 504. Additionally, or alternatively, multi-camera system 200A may apply a second set of weighting factors for color data included in image 502A that does not correspond to overlap region 504.

Multi-camera system 200A may generate a histogram using a subset of pixels in an overlap region. For example, rather than using every pixel in overlap region 504 to generate histograms for normalizing image 502B to image 502A, multi-camera system 200A may determine a subset of pixels in the overlap region by downscaling an image and generating a histogram using the downscaled image. For instance, multi-camera system 200A may downscale image 502B and generate a histogram using pixels of the downscaled image for image 502B that are positioned in overlap region 504. Additionally or alternatively, multi-camera system 200A may determine a subset of pixels in the overlap region by selecting pixels in an image and generating a histogram using the sampled image. For instance, multi-camera system 200A may select alternating pixels of image 502B and generate a histogram using pixels of the selected pixels for image 502B that are positioned in overlap region 504.

After normalizing a histogram of image 502B to image 502A, multi-camera system 200A may normalize a histogram of image 502C to image 502B. After normalizing the histogram of image 502C to image 502B, multi-camera system 200A may normalize a histogram of image 502D to image 502C. In the example of FIG. 5, seams 514-518 that were previously visible due to different brightness and/or tone settings of a camera capturing images 302A-D (e.g., cameras C1-4) may be less visible or invisible.

Multi-camera system 200A may perform an R/G and/or B/G correction. For example, multi-camera system 200A may compute the R/G and B/G ratios for pixels in an original RGB image. For instance, multi-camera system 200A may compute R/G and B/G ratios for pixels in image 502B. In the example, multi-camera system 200A may convert the image from the RGB domain to a YUV domain. In the example, multi-camera system 200A may perform histogram correction on a Y channel (e.g., luma component) of the YUV domain. For instance, color data included in a portion of image 502A that extends in overlap region 504 may indicate a first luma component (e.g., Y channel), the color data included in the portion of image 502B that extends in overlap region 504 may indicates a second luma component (e.g., Y channel) that is different from the first luma component, and the mapping function normalizes the second luma component to the first luma component. In the example, multi-camera system 200A may convert the normalized image from the YUV domain to the RGB domain. In the example, multi-camera system 200A may scale R and B channels by the R/G and B/G ratios to arrive at a new R and B. Said differently, multi-camera system 200A may preserve the red-to-green ratio and blue-to-green ratio between the original image and normalized image by performing R/G and B/G correction. For instance, the normalized image for image 502B may indicate a red-to-green ratio that corresponds to (e.g., matches) a red-to-green ratio indicated by image 502B and the normalized image for image 502B may indicate a blue-to-green ratio that corresponds to (e.g., matches) a blue-to-green ratio indicated by image 502B.

Multi-camera system 200A may determine a correction factor. For example, multi-camera system 200A may determine, for each pixel of image 502B, a correction factor that is based on a distance of a respective pixel from overlap region 504. For instance, multi-camera system 202A may collect statistics for overlapping region 504 between the images 502A and 502B and compute the correction factor based on the collected statistics for overlapping region 504 between the images 502A and 502B. In some examples, multi-camera system 200A may determine the correction factor to be linearly graded such that an amount of correction applied is inversely proportional to a distance from an overlapping boundary. For instance, multi-camera system 200A may determine the correction factor to be linearly graded such that an amount of correction applied to image 502B is inversely proportional to a distance from seam 514.

Multi-camera system 200A may determine a mapping function based on a correction factor. For example, multi-camera system 200A may determine the mapping function based on first and second histograms and the correction factor such that an amount of correction applied to the second image decreases with respect to a distance of the correction from the overlap region. For instance, multi-camera system 200A may determine the mapping function based on a histogram for image 502A, a histogram for image 502B, and the correction factor such that an amount of correction applied to a pixel of image 502B decreases with respect to a distance of the pixel from seam 514. In this manner, multi-camera system 200A may apply less correction to pixels of image 502B that are positioned further from the overlapping region such that an amount of correction applied to pixels positioned at a center of image 502 may be zero.

In the example of FIG. 5, seams 514-518 that were previously visible due to different brightness and/or tone settings of a camera capturing images 302A-D (e.g., cameras C1-4) may be less visible or invisible.

Multi-camera system 200A may perform histogram normalization. For example, multi-camera system 200A may compute overlap region (e.g., 504-508) histograms. For instance, multi-camera system 200A may compute overlap region 504 pairwise using images 502A and B. In the example, multi-camera system 200A may choose one of the cumulative overlap histograms as the target histogram (012) (e.g., for image 502A). In the example, multi-camera system 200A may manipulate pixel values in the corresponding overlap region (O21) to match the target's cumulative histogram. For instance, multi-camera system 200A may manipulate pixel values of image 502B in overlap region 504 to match the target's cumulative histogram for image 502A.

In the example, multi-camera system 200A may apply the mapping thus arrived on the whole image. For instance, multi-camera system 200A may manipulate pixel values of a portion of image 502B extending outside overlap region 504 according to the mapping that manipulates pixel values of image 502B in overlap region 504 to match the target's cumulative histogram for image 502A. In the example, multi-camera system 200A may repeat for the adjacent overlap regions (e.g., overlap regions 506, 508), using the corrected overlap, until all pairs are covered. For instance, multi-camera system 200A may manipulate pixel values of a portion of image 502C extending outside overlap region 506 according to a mapping that manipulates pixel values of image 502C in overlap region 504 to match a target's cumulative histogram for image 502B and may manipulate pixel values of a portion of image 502D extending outside overlap region 508 according to a mapping that manipulates pixel values of image 502D in overlap region 508 to match a target's cumulative histogram for image 502C. In the example of FIG. 5, seams 514-518 of stitched image 502 that were previously visible due to different brightness and/or tone settings of a camera capturing images 302A-D (e.g., cameras C1-4) may be less visible or invisible.

Figure 6:
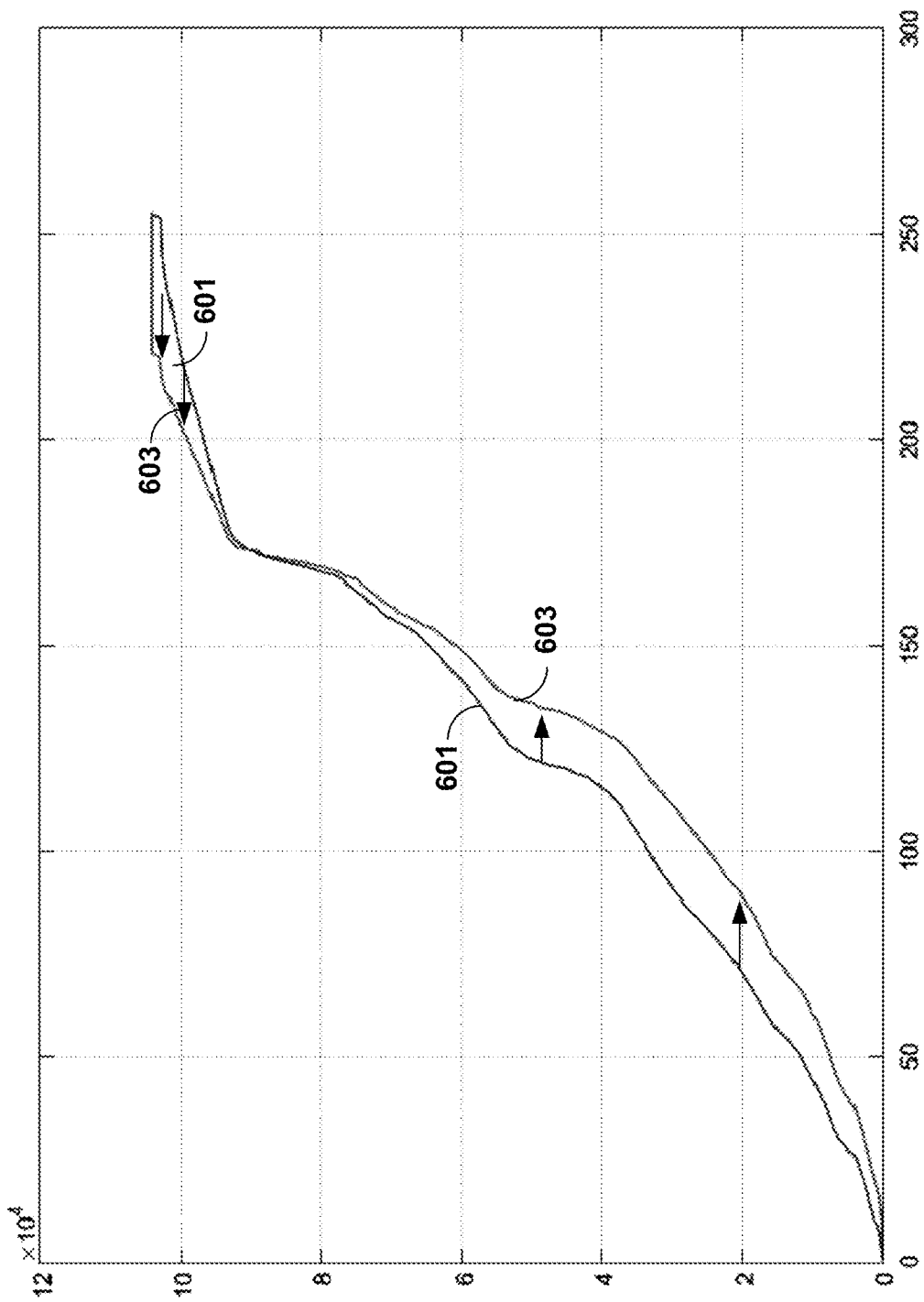
FIG. 6 is a first graph illustrating histogram matching between overlap regions in accordance with one or more example techniques described in this disclosure.

FIG. 6 is a first graph illustrating histogram matching between overlap regions. As shown, histogram 603 has a different distribution of color values than histogram 601. For instance, histogram 603 may represent a cumulative distribution of pixel values for image 502A within overlap region 504 and histogram 601 may represent a cumulative distribution of pixel values for image 502B within overlap region 504. In the example of FIG. 6, multi-camera system 200A may execute a mapping function that substantially maps histogram 601 to histogram 603. For instance, multi-camera system 200A may determine a mapping function that increases pixel values of image 502B that are less than 175 and decreases color values of image 502B that are greater than 175 such that a resulting cumulative distribution of pixel values for image 502B is substantially equal to a cumulative distribution of pixel values for image 502A. As used herein, a first histogram may be substantially equal to a second histogram when each luminance or color value of the first histogram has a frequency that is within 10 percent of a frequency of the second histogram.

Figure 7:
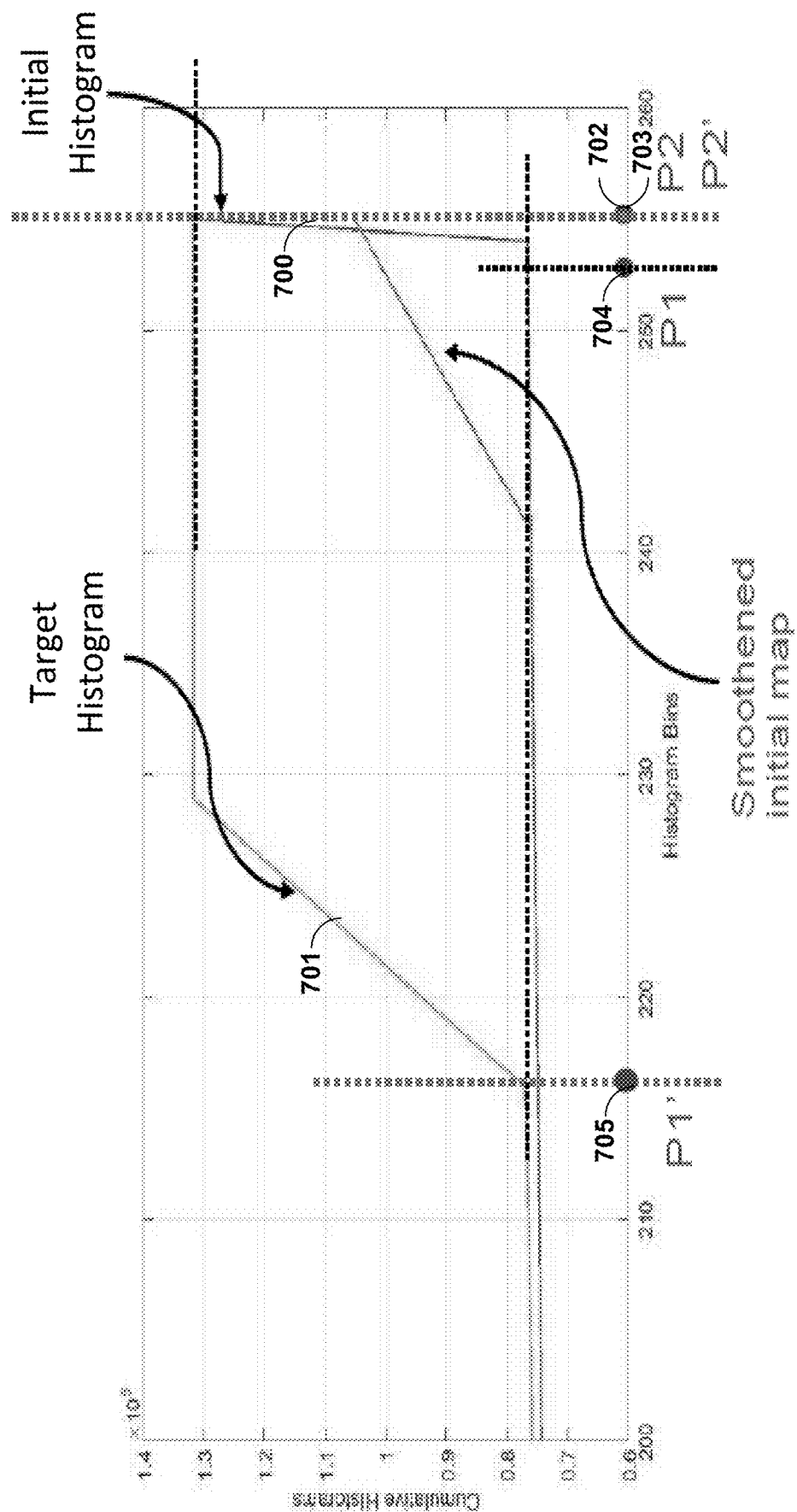
FIG. 7 is a second graph illustrating histogram matching between overlap regions in accordance with one or more example techniques described in this disclosure.

FIG. 7 is a second graph illustrating histogram matching between overlap regions. FIG. 7 is discussed with respect to computing device 10 of FIG. 1, multi-camera system 200A of FIG. 2A, stitched image 202 of FIG. 2B, stitched image 302 of FIG. 3, stitched image 502 of FIG. 5, and histograms 601 and 603 of FIG. 6 for exemplary purposes only.

In the example of FIG. 7, multi-camera system 200A may apply a mapping function based on an overlap region that maps an initial histogram 700 to a target histogram 701. As shown, pixel values 702 and 704 are two close-by pixel values in initial histogram 700. In the example of FIG. 7, multi-camera system 200A may apply a mapping function that modifies the pixel values of the pixels in the overlap region 504 of image 502B to substantially match the pixel values of the pixels in the overlap region 504 of image 502A. More specifically, multi-camera system 200A may map pixel value 702 to pixel value 703 using a mapping function that normalizes pixel values in an overlap region between adjacent images, which is illustrated as substantially similar to pixel value 703. For instance, multi-camera system 200A may set a pixel of image 502B having a pixel value 702 to, instead, have a pixel value 703. Similarly, multi-camera system 200A may map pixel value 704 to pixel value 705 using the mapping function that normalizes pixel values in an overlap region between adjacent images, which is illustrated as very different from pixel value 705. For instance, multi-camera system 200A may set a pixel of image 502B having a pixel value 705 to, instead, have a pixel value 704. Such a difference in mapping pixel values may resulting in contouring artifacts if such pixels are spatially co-located.

Side effects of histogram normalization are discussed in the following. The histogram of the overlap region may not always be representative of the entire camera image. For example, the overlap region may be missing pixel values present elsewhere in the image. For instance, the overlap region may be missing pixel value 704, which is present elsewhere in the image. As a result, some bins in the histogram may have values equal to zero. Zero bin values either in a target (e.g., 701) or source (e.g., 700) histogram may lead to an eccentric cumulative histogram (e.g., zero slope) which may lead to abrupt changes in pixel mappings for pixels which lie in the area around the inflection point of the mapping.

In instances where a pixel values is not present in an overlap region, multi-camera system 200A may modify the pixel value that is not present in the overlap region based on another pixel value. For example, multi-camera system 200A may map, using a mapping function that maps initial histogram 700 to target histogram 701, pixel value 704, which is not present in the overlap region based on pixel value 702, which is present in the overlap region. As shown, multi-camera system 200A may map, using a mapping function that maps initial histogram 700 to target histogram 701, pixel value 704 to pixel value 705, which is illustrated as being substantially different than pixel value 704. For instance, multi-camera system 200A may set a pixel of image 502B having a pixel value 704 to, instead, have a pixel value 705. As such, multi-camera system 200A may map similar pixel values 702 and 704 very differently such that pixel value 702 is modified substantially less than pixel value 704. As a result of mapping similar pixel values 702 and 704 very differently, multi-camera system 200A may introduce contouring artifacts in the corrected image.

Figure 8:
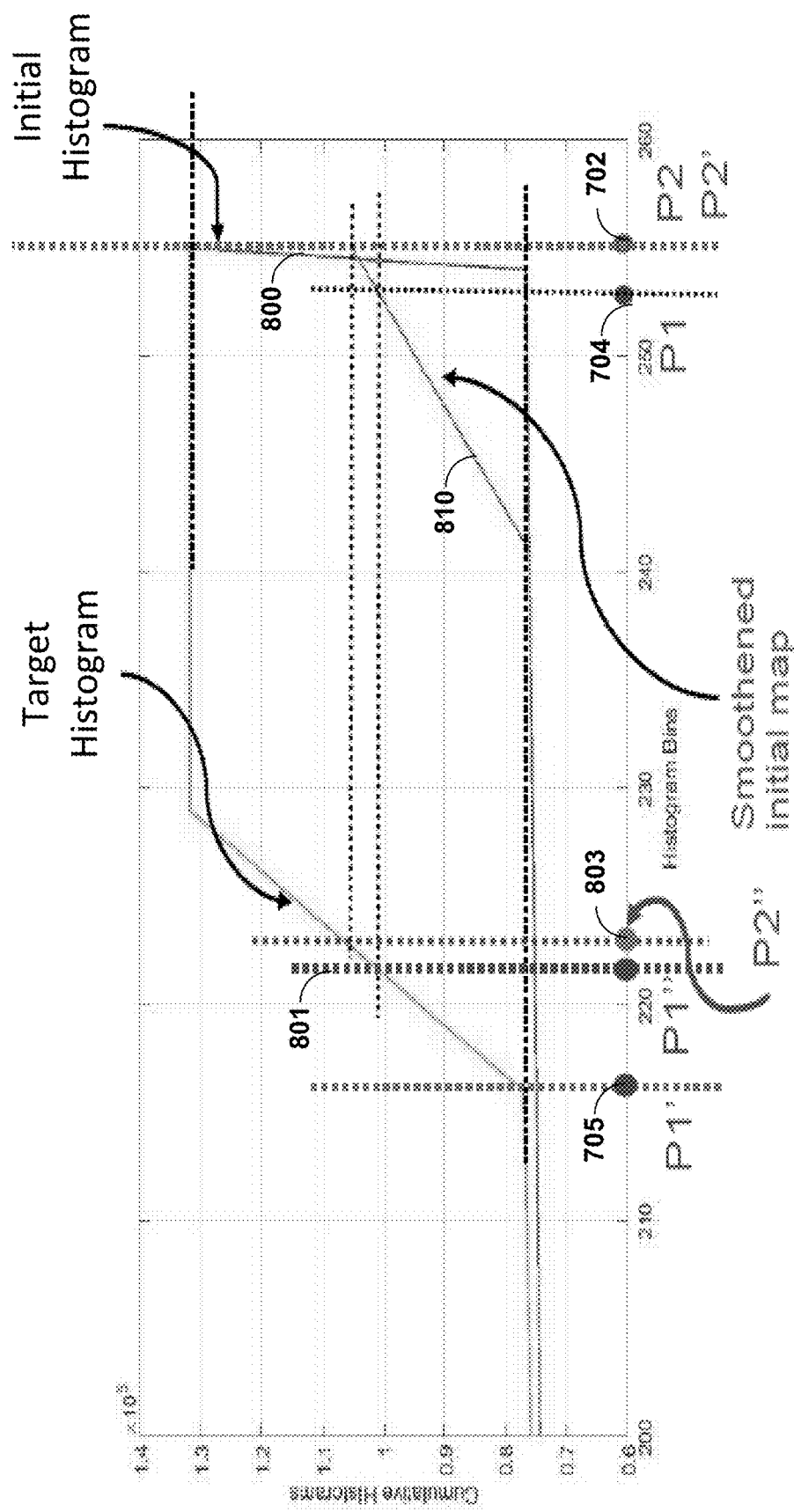
FIG. 8 is a third graph illustrating histogram matching between overlap regions in accordance with one or more example techniques described in this disclosure.

FIG. 8 is a third graph illustrating histogram matching between overlap regions. FIG. 8 is discussed with respect to computing device 10 of FIG. 1, multi-camera system 200A of FIG. 2A, stitched image 202 of FIG. 2B, stitched image 502 of FIG. 5, and histograms 601 and 603 of FIG. 6 for exemplary purposes only.

Techniques for improving pixel mapping are discussed in FIG. 8. Improved normalization may include a smoothing function when manipulating pixel values in the corresponding overlap region of image 502B (O21) to match the target cumulative histogram 801. In some examples, the smoothing function may include smoothing both target cumulative histogram 801 and/or the source cumulative histogram 800 before applying any manipulation. For instance, multi-camera system 200A may be configured to smooth source cumulative histogram 800 and/or target cumulative histogram 801. As shown, multi-camera system 200A may smooth source cumulative histogram 800 to generate smoothed source cumulative histogram 810. In some examples, the smoothing function may include deducing the mapping from the smoothed cumulative histograms. For instance, multi-camera system 200A may determine a mapping function according to smoothed cumulative histograms for normalizing images 502A-D of stitched image 502.

Multi-camera system 200A may smooth a histogram using a low-pass filter function (e.g., blurring). For example, multi-camera system 200A may smooth source cumulative histogram 800 using a low-pass filter function. Examples of low pass filter functions may include, but are not limited to, low pass spatial filtering, reconstruction filtering, enhancement filtering, or other low pass filter functions.

Advantages of filtering the histogram are discussed in the following. Even if some pixel values are missing in the overlap region, the mapping function may remain continuous and without a drastic variation in mapping. In some examples, avoiding abrupt pixel value mapping may remove contouring artifacts in the normalized image. As shown in FIG. 8, multi-camera system 200A may map, using a mapping function that maps smoothed source cumulative histogram 810 to target cumulative histogram 801, pixel value 704, which is not present in the overlap region based on pixel value 702, which is present in the overlap region. As shown, multi-camera system 200A may map, using a mapping function that maps smoothed source cumulative histogram 810 to target cumulative histogram 801, pixel value 702 to pixel value 803 and may map, using a mapping function that maps smoothed source cumulative histogram 810 to target cumulative histogram 801, pixel value 704 to pixel value 705. For instance, multi-camera system 200A may set a pixel of image 502B having pixel value 704 to, instead, have pixel value 705 and may set a pixel of image 502B having a pixel value 702 to, instead, have a pixel value 803. As shown, pixel values 705 and 803 may be mapped closer than pixel values 705 and 703, thereby reducing contouring artifacts in the normalized image.

Figure 9:
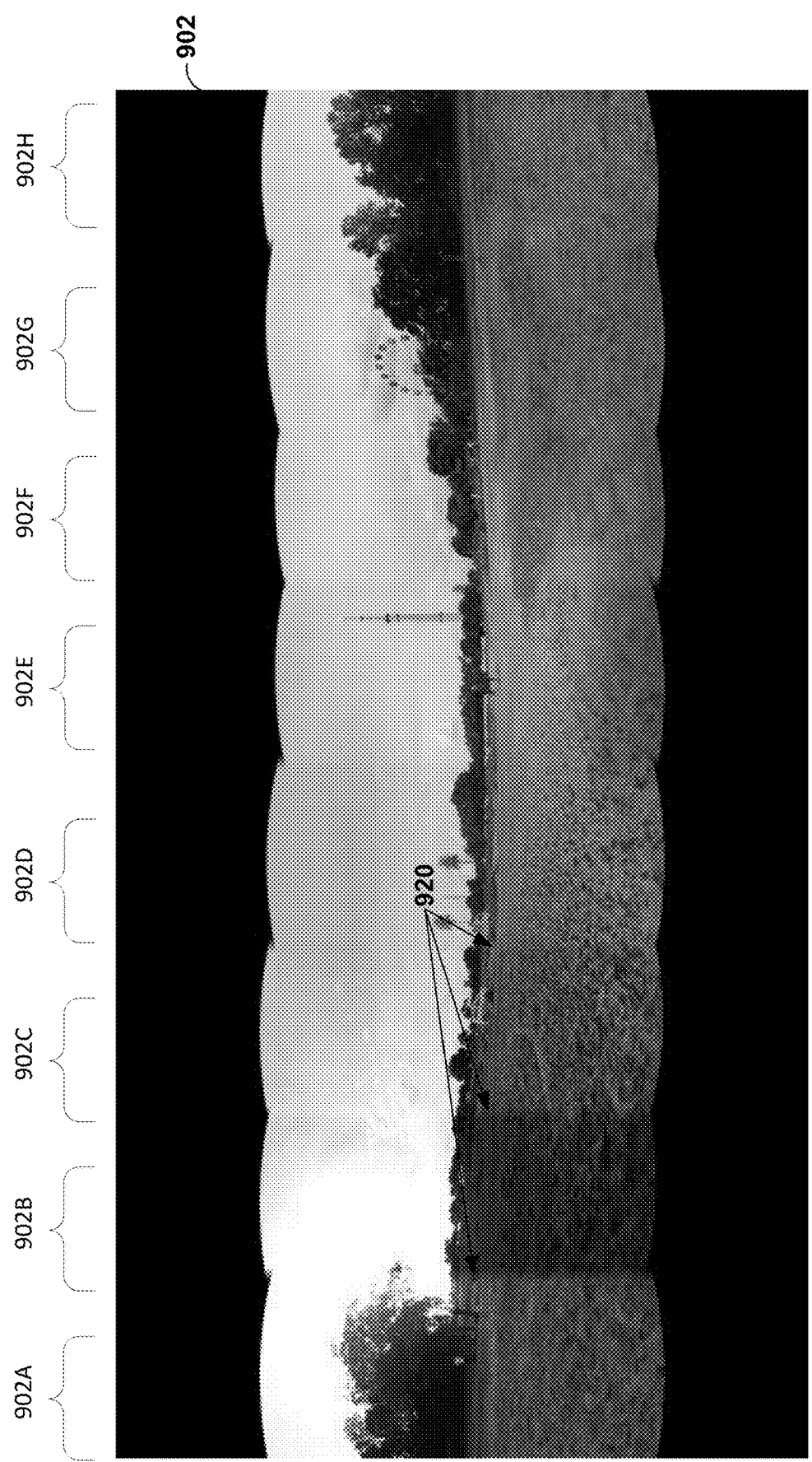
FIG. 9 is an example stitched image using global gamma correction in accordance with one or more example techniques described in this disclosure.

FIG. 9 is an example stitched image using global gamma correction. FIG. 9 is discussed with respect to multi-camera system 200A of FIG. 2A for exemplary purposes only. As shown, stitched image 902 may include images 902A-H. For instance, image 902A may be captured by C1 of FIG. 2A, image 902B may be captured by C2 of FIG. 2A, image 902C may be captured by C3 of FIG. 2A, and so forth. In the example of FIG. 9, multi-camera system 200A may apply global gamma correction to images 902A-H. However, as illustrated in FIG. 9, boundaries 920 of images 902A-H are visible.

Figure 10:
FIG. 10 is an example stitched image using histogram normalization in accordance with one or more example techniques described in this disclosure.

FIG. 10 is an example stitched image using histogram normalization. FIG. 10 is discussed with respect to multi-camera system 200A of FIG. 2A for exemplary purposes only. As shown, stitched image 1002 may include images 1002A-H. For instance, image 1002A may be captured by C1 of FIG. 2A, image 1002B may be captured by C2 of FIG. 2A, image 1002C may be captured by C3 of FIG. 2A, and so forth. In the example of FIG. 10, multi-camera system 200A may apply histogram normalization to images 1002A-H. However, as illustrated in FIG. 10, images 1002A-H contain saturation 1022 and contouring artifacts 1024.

Figure 11:
FIG. 11 is an example stitched image using global gamma correction and histogram normalization in accordance with one or more example techniques described in this disclosure.

FIG. 11 is an example stitched image using global gamma correction and histogram normalization. FIG. 11 is discussed with respect to multi-camera system 200A of FIG. 2A for exemplary purposes only. As shown, stitched image 1102 may include images 1102A-H. For instance, image 1102A may be captured by C1 of FIG. 2A, image 1102B may be captured by C2 of FIG. 2A, image 1102C may be captured by C3 of FIG. 2A, and so forth. In the example of FIG. 11, multi-camera system 200A may apply histogram normalization and global gamma correction to images 1102A-H. However, as illustrated in FIG. 11, images 1102A-H contain saturation 1122 and contouring artifacts 1124.

Figure 12:
FIG. 12 is an example stitched image using joint gamma correction and filtered histogram normalization accordance with one or more example techniques described in this disclosure.

FIG. 12 is an example stitched image using global gamma correction and filtered histogram normalization. FIG. 12 is discussed with respect to multi-camera system 200A of FIG. 2A for exemplary purposes only. As shown, stitched image 1202 may include images 1202A-H. For instance, image 1202A may be captured by C1 of FIG. 2A, image 1202B may be captured by C2 of FIG. 2A, image 1202C may be captured by C3 of FIG. 2A, and so forth. In the example of FIG. 12, multi-camera system 200A may apply filtered (e.g., smoothed) histogram normalization and global gamma correction to images 1202A-H. As illustrated in FIG. 12, multi-camera system 200A has removed saturation and contouring artifacts from images 1202A-H.

In some examples, a panorama with histogram normalization may have the following features. Seams between different cameras (e.g., C1-Cn) may be not be visible when one or more techniques described herein are applied to all color channels. If an anchor camera frame is captured using a flashing light, all other frames may show a similar disturbance, which may indicate a propagation of color maps.

In summary, a proposed system flow and techniques (e.g., based on histogram normalization) may have potential for matching illumination differences in multiple camera captures. Such techniques may be useful in performing correction post-processing when one does not have control on camera parameters during capture. As such, multi-camera system 200A may achieve enhanced local matching by local color blending between overlap regions downstream of global color correction.

Additionally, or alternatively, to techniques described herein for histogram normalization, a multi-camera system may optimize a luminance of images for the stitched image. For instance, multi-camera system 200A may match a mean luminance value of each bin of a set of bins for images 502A and 502B of stitched image 502 to normalize brightness and color differences of stitched image 502. In this manner, differences in the multiple cameras used to capture an image in 360 degrees may be reduced, thereby resulting in a stitched image having reduced ghosting artifacts while also normalizing brightness and color differences between different images in the stitched image.

Motivation relating to one or more techniques described herein are discussed in the following. In multiple camera systems (e.g., multi-camera system 200A), images may be captured using multiple cameras and stitched together, e.g. 360-degree virtual camera systems. Such systems may include many cameras, for example, but not limited to, from 2 to 8, or even more cameras. Different cameras may be exposed to different lighting conditions. Different cameras may run 3A algorithms (e.g., auto-exposure, auto-focus, auto-white balance). A same object may take different colors in images captured by different cameras and results in visible artificial boundaries where two camera images meet. Examples of such visible artificial boundaries are illustrated in FIG. 2B.

Figure 13:
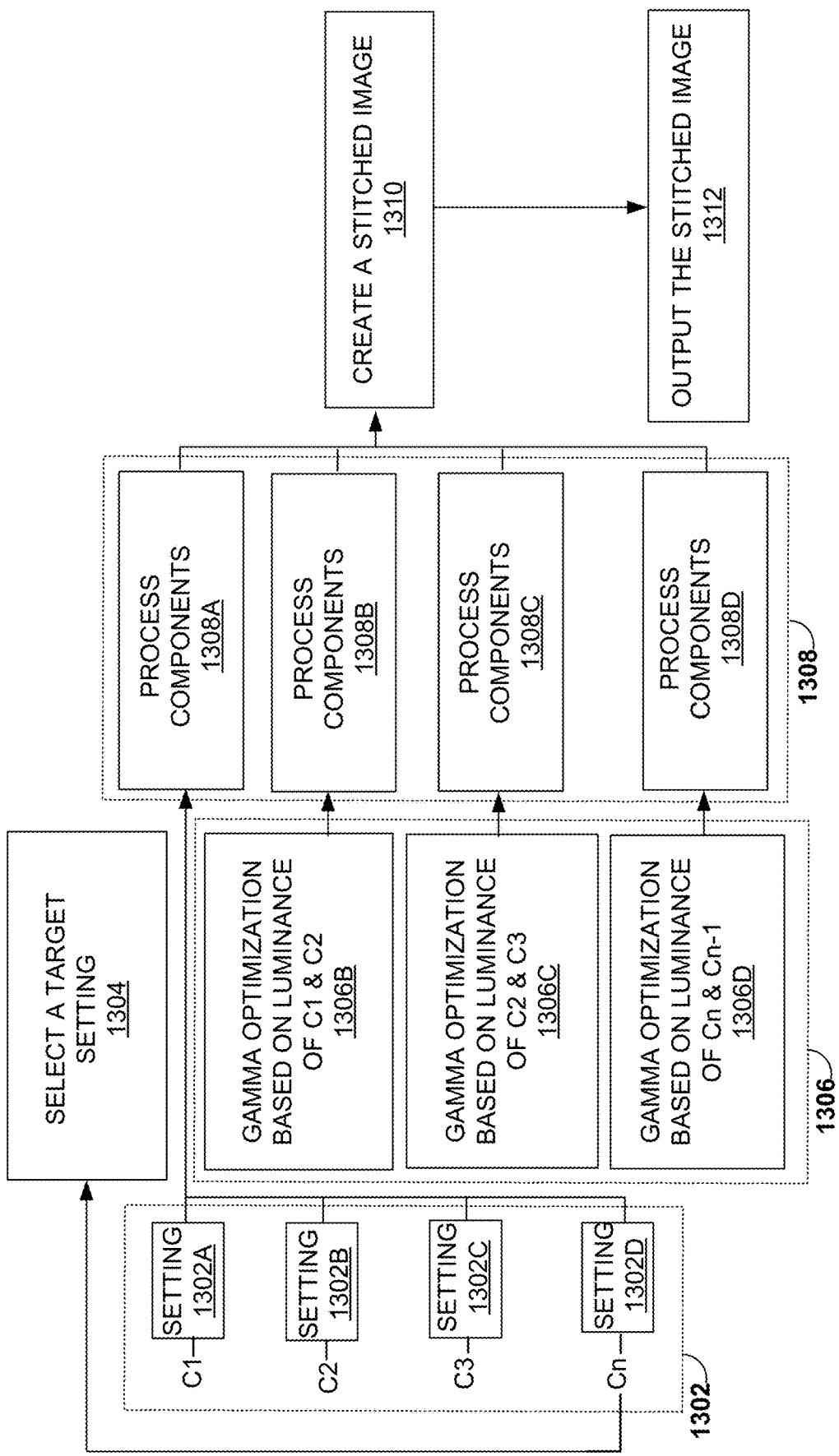
FIG. 13 is a flowchart illustrating exemplary operation of the device of FIG. 1 in performing various aspects of stitching techniques described in this disclosure.

FIG. 13 is a flowchart illustrating exemplary operation of the device of FIG. 1 in performing various aspects of stitching techniques described in this disclosure. FIG. 13 is discussed with respect to computing device 10 of FIG. 1, multi-camera system 200A of FIG. 2A, stitched image 202 of FIG. 2B, stitched image 302 of FIG. 3, and stitched image 502 of FIG. 5, for exemplary purposes only.

In the example of FIG. 13, cameras C1-Cn capture images using independently configured settings (1302). For instance, camera C1 may have a brightness and/or tone setting that is different than camera C2. Multi-camera system 200A may select a target setting from cameras C1-Cn (1304). For example, multi-camera system 200A may select a setting from camera Cn as the target setting based on a dominant illuminant across cameras C1-Cn.

Multi-camera system 200A may perform a gamma optimization based on luminance for Cn based on overlap region of Cn and Cn−1. For example, multi-camera system 200A may minimize an error function representing gamma values based on overlap regions (1306). In the example of FIG. 13, multi-camera system 200A may minimize a first error function representing gamma values according overlap region 304 (1306B), minimize a second error function representing gamma values according overlap region 306 (1306C), and minimize a third error function representing gamma values according overlap region 308 (1306D).

In some examples, gamma optimization may equalize the mean luminance of pixel values in the overlap regions between adjacent images. Equalizing mean luminance values of pixels instead of individual pixels may simplify the problem as well as yield a closed form solution. Optimization may be performed by multi-camera system 200A solving a system of linear equations.

$$Lg_{i,j} \rightarrow L_{i,j}^{\gamma i} \qquad \text{(Equation 1)}$$

where Li,j refers to the luminance component of the overlap region Oi,j

In some examples, an error function to be minimized between pair of frames may be represented by equation 2.

$$E = \frac{1}{2}\left\{\frac{(\text{mean}(L_g ij) - \text{mean}(L_g ji))^2}{\sigma_n^2} + \Sigma_i \frac{(1-\gamma_i)^2}{\sigma_g^2}\right\} \qquad \text{(Equation 2)}$$

where the 1 st term is the difference of the mean gamma corrected pixel value in the pairwise overlapping areas. The 2nd term constrains γ to stay close to 1. The $\sigma_g$ and $\sigma_n$ are chosen to weigh between the two terms.

Multi-camera system 200A may minimize the above error function by solving a set of linear equations. In a system with N cameras, there may be N such equations, which multi-camera system 200A may solve jointly.

In some examples, gamma optimization may include instances where multi-camera system 200A may determine a set of mapping functions. For example, rather than minimizing an error function for an entire image captured by a single camera (e.g., single gamma correction), multi-camera system 200A may minimizing an error function for a set of mapping functions, where each mapping function of the set of mapping functions maps, for a respective luminance bin of the set of luminance bins, a mean luminance value for color data included in a second image that corresponds to the overlap region to a mean luminance value for color data included in the first image that corresponds to the overlap region. For instance, multi-camera system 200A may minimizing an error function for a set of mapping functions, where each mapping function of the set of mapping functions maps, for a respective luminance bin of the set of luminance bins, a mean luminance value for color data included in image 502B that corresponds to overlap region 504 to a mean luminance value for color data included in image 502A that corresponds to overlap region 504.

The following discusses benefits of gamma optimization of each bin of a set of bins for an image rather than a single gamma optimization for the entire image. For example, multi-camera systems applying a single gamma correction per image boundary, for instance, based on a mean value, may not normalize a color mismatch between images significantly compared to instances where multi-camera systems apply a multi-gamma optimization. Additionally, or alternatively, multi-camera systems trying to arrive at an optimal gamma value based on mismatches in individual pixel values may be too complicated and may not yield a closed form solution. Multi-camera systems finding pixel correspondences may also be challenging to implement and may lead to incorrect matches, thereby causing errors in optimization.

The following discusses instances where an image pair is captured from two cameras on a multi-camera setup (e.g., multi-camera system 200A). In such an example, all objects captured by the multi-camera setup may not have similar color mismatches. For example, blacks in two images captured by the multi-camera setup may look similar but browns may not look similar. Normalizing mean values of pixels using a single gamma optimization for the entire image may not result in matching all pixels. Accordingly, multi-gamma optimization techniques may improve an image processing of stitched images compared to single gamma optimization techniques.

Multi-camera system 200A may process components of images captured based on the minimized error functions representing gamma values (1308). For example, multi-camera system 200A may process components in image 202A (1308A), process components in image 202B (1308B), process components in image 202C (1308C), and process components in image 202D (1308D). Examples of process components may include, but are not limited to, undistort, spherically project, perspective transform, color correct, or other process components.

Multi-camera system 200A may create a stitched image (e.g., a 360 canvas) (1310). For example, multi-camera system 200A may blend across frames at seams 314-318. Multi-camera system 200A may output the stitched image (1312). For example, Multi-camera system 200A may initiate an encoding of the stitched image, cause the (encoded) stitched image to be transmitted to another device and/or cause the (encoded) stitched image to be stored.

In some examples, multi-camera system 200A may match colors at finer level than just matching the means of overlap regions. For example, multi-camera system 200A may divide the overlap region into multiple sub regions, e.g. a rectangular grid. Mean values for each sub region may be separately matched. For example, multi-camera system 200A may separately match mean values for each sub region. However, the subregions may contain pixels belonging to different objects and hence may have very different colors and luminance. Matching mean values of these sub-regions may not solve the problem. Further, a single object/smooth area in the original image may get split into different subregions, each of which will go through a different correction (e.g., different gamma value), which may lead to contouring and boundaries may be visible at the grid boundaries.

Instead, a device performing one or more techniques described herein, may identify "luminance correspondences" between overlapping areas of two adjacent images. For example, multi-camera system 200A may identify "luminance correspondences" between overlapping areas of two adjacent images. For instance, multi-camera system 200A may identify "luminance correspondences" between overlap region 304 of images 302A and B, "luminance correspondences" between overlap region 306 of images 302B and C, and "luminance correspondences" between overlapping region 308 of images 302C and D. Luminance values may be binned and correspondence between two images may be established for each luminance bin. For example, multi-camera system 200A may match a mean value of each luminance bin by using the gamma correction formulation.

In some examples, multi-camera system 200A may optimize multiple gamma bin to achieve luma and/or color consistence across the stitch seams. In some examples, multi-camera system 200A may identify a number of gamma bins as a function of scene statistics calculated over all cameras in the rig (e.g., number of diverse illuminants). It should be understood that multi-camera system 200A may identify illuminant based on one or more AWB techniques.

Identifying luminance correspondences are discussed in the following. Regarding image registration, it is noted that in multi-camera applications such as 360 video/image stitching, adjacent images may be registered using image registration techniques and then stitched together. Image registration may be achieved by transforming one of the images such that it aligns with the other. For example, a linear transform or a series of transforms that may involve multiple linear or non-linear transformations may include I2=T(I1), where T describes the resulting transform required to align the two images.

In some examples, transform T may map the pixels in image I1 to pixels in image I2. This map may be used to establish pixel correspondences. Assuming that the registration is of reasonably good quality, there may be a high likelihood that the pixel correspondence that is established is accurate. Because registration may not be accurate for all the pixels (e.g. edge pixels), multi-camera system 200A may use a threshold to classify a correspondence between two images as valid or invalid. For example, in response to multi-camera system 200A determining that a position of a pixel satisfies a threshold, multi-camera system 200A may determine that the pixel is valid. For instance, in response to multi-camera system 200A determining that log(p2(I,j))−log(p1(I,j)) is greater than a threshold, multi-camera system 200A may determine that the correspondence between the images is invalid. Additionally, or alternatively, in response to multi-camera system 200A determining that log(p2(I,j))−log(p1(I,j)) is not greater than a threshold, multi-camera system 200A may determine that the correspondence between the is valid. In response to determining that the pixel of a first image satisfies the threshold, multi-camera system 200A may associate a pixel with a luminance bin of the set of luminance bins, where the mapping function for the luminance bin is based on associating the pixel with the luminance bin of the set of luminance bins. For instance, multi-camera system 200A may associate pixels that satisfy the threshold with a luminance bin of the set of luminance bins and refrain from associating pixels with a luminance bin of the set of luminance bins that do not satisfy the threshold.

Additionally, or alternatively, edge pixels may be identified and eliminated from pixel correspondence calculation from both the images. For example, multi-camera system 200A may determine whether a pixel of the first image is an edge pixel of the first image. For instance, multi-camera system 200A may determine whether a pixel of image 502A is an edge pixel of image 502A. In response to determining that the pixel of the first image is not an edge pixel of the first image, multi-camera system 200A may associate the pixel with a luminance bin of the set of luminance bins, where the mapping function for the luminance bin is based on associating the pixel with the luminance bin of the set of luminance bins. For instance, multi-camera system 200A may associate pixels that satisfy the threshold with a luminance bin of the set of luminance bins and refrain from associating pixels with a luminance bin of the set of luminance bins that do not satisfy the threshold.

In some examples, luminance values in one of the images may be separated into N bins (B1, B2, . . . Bn). For all the pixels in bin Bi, corresponding pixels in the other image may be identified and grouped together. Mean values m11, m12, . . . m1n may be calculated for pixels in bins 1 to n in the first image. Mean values m21, m22, . . . m2n may be calculated for pixels in $2^{nd}$ image that correspond to pixels in $1^{st}$ image in bins 1, 2, . . . n. Bin boundaries may be identified either statically (predefined) or dynamically.

Dynamic bin boundary determination techniques are discussed in the following. Multi-camera system 200A may place bin boundaries at flat regions in the image CDF (e.g., CDF slope~=0). In this manner, multi-camera system 200A may reduce a probability of similar color pixels falling in different bins, thus reducing contouring artifacts.

Figure 14:
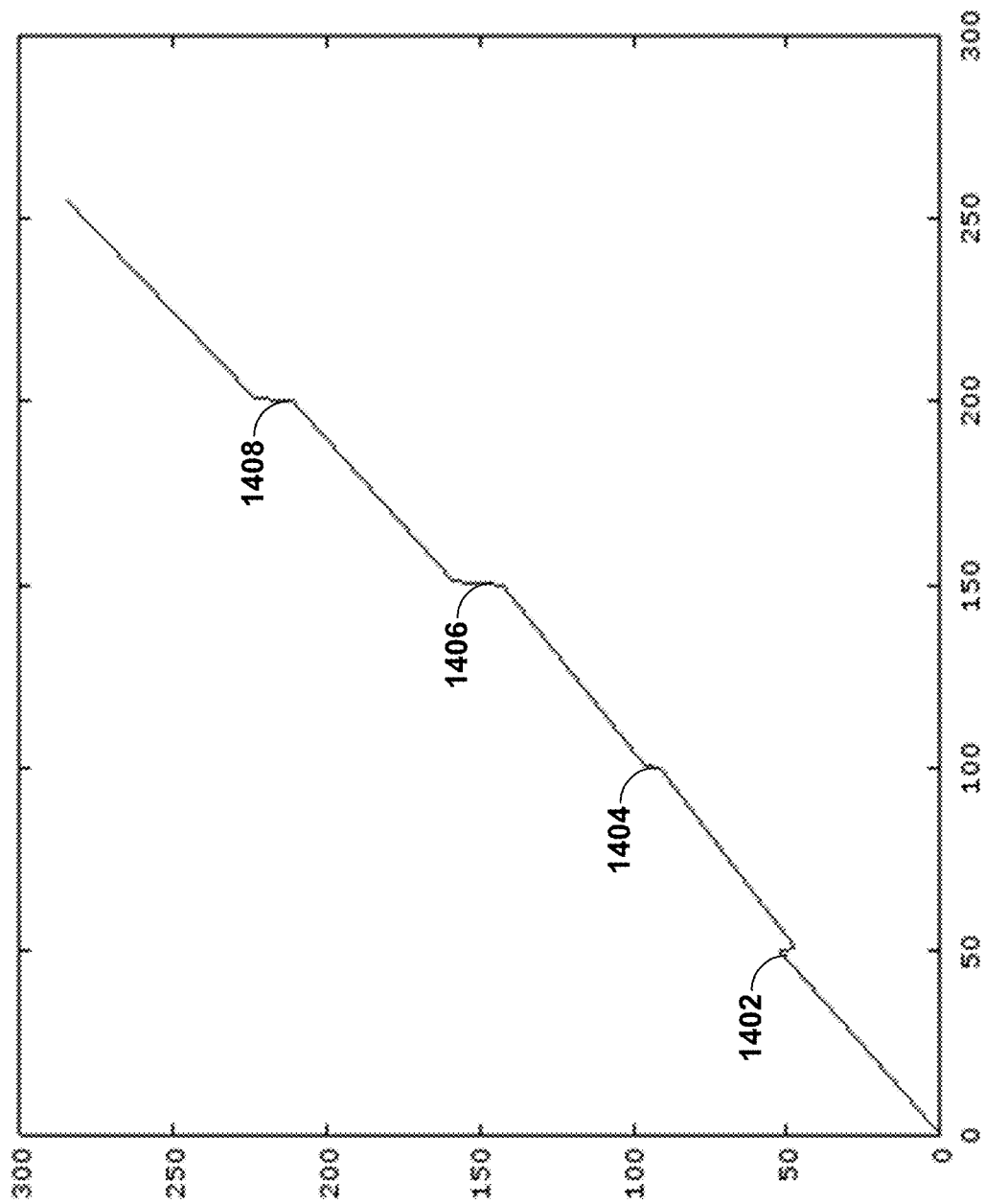
FIG. 14 is a graph illustrating discontinuities at bin boundaries in accordance with one or more example techniques described in this disclosure.

FIG. 14 is a graph illustrating discontinuities at bin boundaries. FIG. 14 is discussed with respect to computing device 10 of FIG. 1, multi-camera system 200A of FIG. 2A, stitched image 202 of FIG. 2B, and stitched image 302 of FIG. 3 for exemplary purposes only. An example multi-gamma optimization technique is described as follows. For each image pair, there may be a set of mean value correspondences m11→m21; m12→m22; . . . ; m1n→m2n. These n correspondences for all the camera pairs may be fed into the gamma optimization formulation described earlier. For instance, multi-camera system 200A may feed n correspondences for all the camera pairs into the gamma optimization formulation described earlier in FIG. 13 (1306). In this manner, multiple mean values per image may be thus jointly optimized. Optimization framework may yield a unique gamma value to be applied for each of the mean values.

Figure 15:
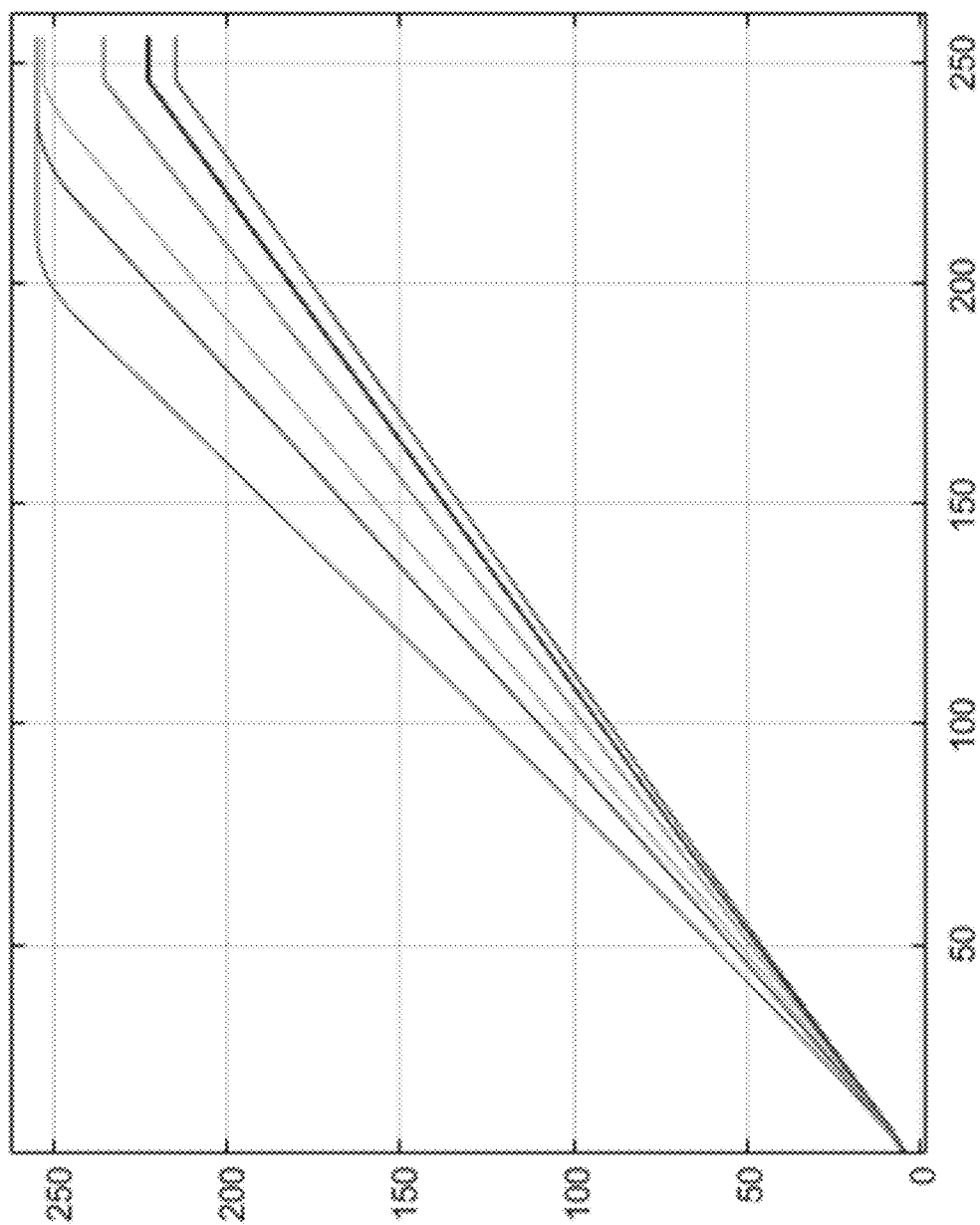
FIG. 15 is a graph illustrating a single gamma per image in accordance with one or more example techniques described in this disclosure.
Figure 16:
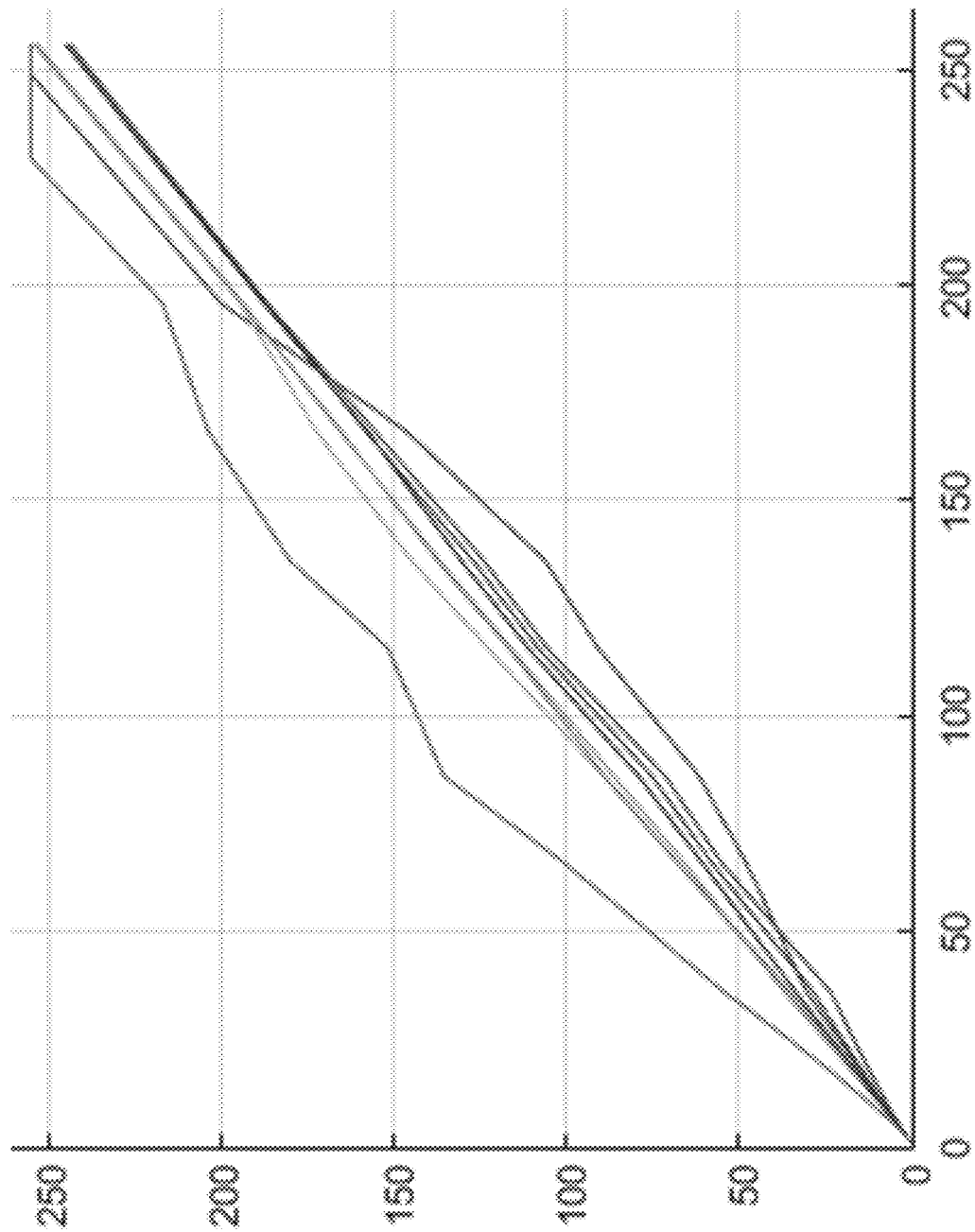
FIG. 16 is a graph illustrating multiple gamma per image in accordance with one or more example techniques described in this disclosure.

As shown, optimization frame work may result in discontinuities 1402-1408 at the bin boundaries due to different gamma value being calculated for different bins (see FIG. 14). These discontinuities may be smoothed out by using an appropriate curve smoothing technique, e.g. linearly distributing the difference in output values at the discontinuity over a small range of input values symmetric about the discontinuity (see FIG. 15). For example, multi-camera system 200A may apply, before applying the set of mapping functions to luminance components of the second image, a curve smoothing technique to the set of mapping functions. A smoothed map between the input and output pixel values for each image may thus be obtained as can be seen in FIG. 15 (FIG. 15 shows multiple such different smoothed maps—one for each image). FIG. 14 shows maps for the example when only 1 mean pair was matched for each image pair. FIG. 15 is a graph illustrating a single gamma correction per image. FIG. 16 is a graph illustrating multiple gamma correction per image.

Figure 17:
FIG. 17 is an example stitched image using no color correction in accordance with one or more example techniques described in this disclosure.

FIG. 17 is an example stitched image using no color correction. FIG. 17 is discussed with respect to multi-camera system 200A of FIG. 2A for exemplary purposes only. As shown, stitched image 1702 may include images 1702A-H. For instance, image 1702A may be captured by C1 of FIG. 2A, image 1702B may be captured by C2 of FIG. 2A, image 1702C may be captured by C3 of FIG. 2A, and so forth. In the example of FIG. 17, multi-camera system 200A may apply no correction to images 1702A-H. As shown, there may be severe mismatch in color at image boundaries 1720.

Figure 18:
FIG. 18 is an example stitched image using a single gamma correction in accordance with one or more example techniques described in this disclosure.

FIG. 18 is an example stitched image using a single gamma correction. FIG. 18 is discussed with respect to multi-camera system 200A of FIG. 2A for exemplary purposes only. FIG. 18 shows a stitched video frame using a single optimized gamma value for each image. As shown, stitched image 1802 may include images 1802A-H. For instance, image 1802A may be captured by C1 of FIG. 2A, image 1802B may be captured by C2 of FIG. 2A, image 1802C may be captured by C3 of FIG. 2A, and so forth. In the example of FIG. 18, multi-camera system 200A may apply single gamma correction to images 1802A-H. As shown, there may be moderate mismatch in color at image boundaries 1820.

Figure 19:
FIG. 19 is an example stitched image using multiple gamma correction in accordance with one or more example techniques described in this disclosure.

FIG. 19 is an example stitched image using multiple gamma correction. FIG. 19 is discussed with respect to multi-camera system 200A of FIG. 2A for exemplary purposes only. FIG. 19 shows a stitched video frame using a proposed multi-gamma optimization technique. As shown, color mismatches may be reduced significantly. As shown, stitched image 1902 may include images 1902A-H. For instance, image 1902A may be captured by C1 of FIG. 2A, image 1902B may be captured by C2 of FIG. 2A, image 1902C may be captured by C3 of FIG. 2A, and so forth. In the example of FIG. 19, multi-camera system 200A may apply multi-gamma correction to images 1902A-H. As shown, there may be little or no mismatch in color at image boundaries 1920.

These techniques may achieve any or all of the following benefits. In some examples, techniques may include a closed form solution which can be extended to 360-degree video for all the captured views. In some examples, good color matching may be achieved between cameras. In some examples, contouring/saturation artifacts may be reduced compared to single-gamma. In some examples, bin boundaries may play an important role. Different color tint may be found in different camera products. Some R/G, B/G approaches may retain this tint. Gamma equalization on G channel instead of Y yields may yield similar results visually. However, conversion from G to Y and back could lead to loss of some dynamic range as Y ranges from 16-240 which is less than the dynamic range of G (e.g., 0-255).

Some techniques may be used to perform evaluations on bigger/diverse capture set, identify a mapping of multi-gamma application to a camera front-end hardware and/or software control on color blocks. Some techniques may automate one or more of a selection of anchor frame, a bin boundary determination (e.g., using heuristic), a conversion of multiple gamma transformation to a monotonic map (e.g., using a heuristic). Hysteresis may be incorporated temporally to avoid sudden changes in gamma.

Figure 20:
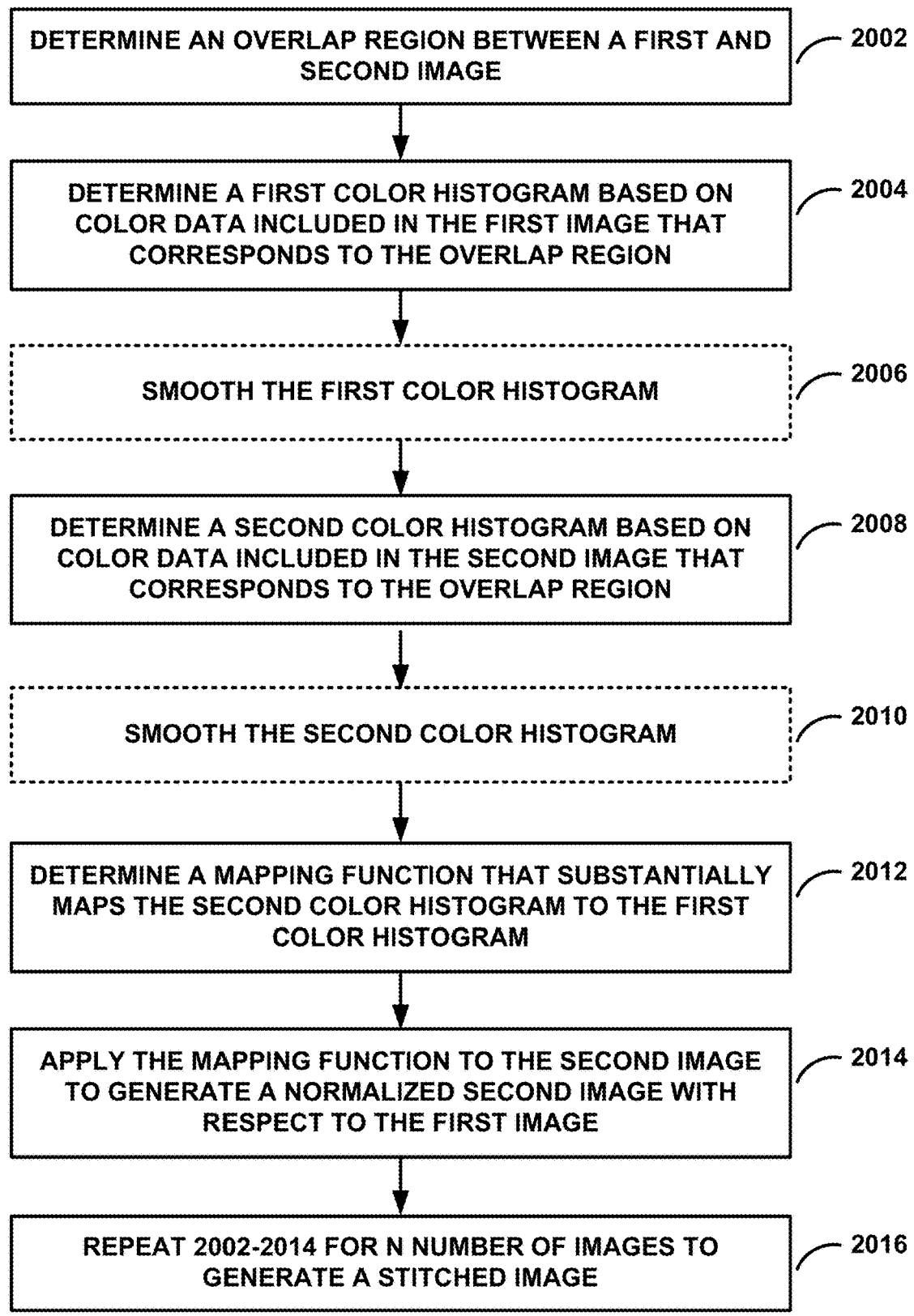
FIG. 20 is a flowchart illustrating an example technique for histogram normalization in accordance with one or more example techniques described in this disclosure.

FIG. 20 is a flowchart illustrating an example technique for histogram normalization according to techniques described in this disclosure. FIG. 20 is discussed with respect to computing device 10 of FIG. 1, multi-camera system 200A of FIG. 2A, stitched image 202 of FIG. 2B, stitched image 302 of FIG. 3, images 502A-D of FIG. 5, histograms 601 and 603 of FIG. 6, and pixel value 702-705 of FIG. 7 for exemplary purposes only.

In operation, multi-camera system 200A may determine an overlap region between a first and second image (2002). For example, multi-camera system 200A may determine that overlap region 504 overlaps images 502A and B. Multi-camera system 200A may determine a first histogram based on color data included in the first image that corresponds to the overlap region (2004). For example, multi-camera system 200A may determine histogram 603 of FIG. 6. In some examples, multi-camera system 200A may optionally smooth the first histogram (2006). For example, multi-camera system 200A may apply a low pass filter function to the first histogram. Multi-camera system 200A may determine a second histogram based on color data included in the second image that corresponds to the overlap region (2008). For example, multi-camera system 200A may determine histogram 601 of FIG. 6. In some examples, multi-camera system 200A may optionally smooth the second histogram (2010). For example, multi-camera system 200A may apply a low pass filter function to the second histogram.

Multi-camera system 200A may determine a mapping function that substantially maps the second histogram to the first histogram (2012). For example, multi-camera system 200A may determine a mapping function configured to modify each luminance or color values of the second histogram to have a frequency of the first histogram. Multi-camera system 200A may apply the mapping function to the second image to generate a normalized second image with respect to the first image (2014). For example, multi-camera system 200A may set pixels of a second image having pixel value 702 of FIG. 7 to instead have pixel value 703 of FIG. 7, and similarly, set pixels of the second image having pixel value 704 of FIG. 7 to instead have pixel value 705 of FIG. 7.

Multi-camera system 200A may repeat the techniques illustrated in 2002-2014 for N number of images to generate a stitched image (2016). For example, multi-camera system 200A may apply a mapping function to image 502B to generate a normalized image 502B with respect to image 502A. In the example, multi-camera system 200A may apply a second mapping function to image 502C to generate a normalized image 502C with respect to the image 502B, generate a normalized image 502D with respect to the image 502C, and so forth.

More specifically, multi-camera system 200A may determine, after applying the mapping function to the second image to generate a normalized second image with respect to the first image, an overlap region between the normalized second image and a third image. For instance, multi-camera system 200A may determine, after applying the mapping function to image 502B to generate a normalized image of image 502B with respect to image 502A, overlap region 506 between the normalized image of image 502B and image 502C. In the example, multi-camera system 200A may determine a normalized second histogram based on color data included in the normalized second image that corresponds to the overlap region between the normalized second image and a third image. For instance, multi-camera system 200A may determine a normalized second histogram based on color data included in the normalized image of image 502B that corresponds to overlap region 506 between the normalized image of image 502B and image 502C. In the example, multi-camera system 200A may determine a third histogram based on color data included in the third image that corresponds to the overlap region between the normalized second image and a third image. For instance, multi-camera system 200A may determine a third histogram based on color data included in third 502C image that corresponds to overlap region 506 between the normalized image of image 502B and image 502C. In the example, multi-camera system 200A may determine, based on the normalized second histogram and the third histogram, a mapping function that substantially maps the third histogram to the normalized second histogram. In the example, multi-camera system 200A may apply the mapping function that substantially maps the third histogram to the normalized second histogram to the third image to generate a normalized third image with respect to the normalized second image. For instance, multi-camera system 200A may apply the mapping function that substantially maps the third histogram to the normalized second histogram to image 502C to generate a normalized image of image 502C with respect to the normalized image of image 502B. In the example, multi-camera system 200A may sequentially apply a set of mapping functions to N number of images, N being greater than 3, where the set of mapping functions includes the mapping function that substantially maps the second histogram to the first histogram and the mapping function that substantially maps the third histogram to the normalized second histogram and where the N number of images includes the first image (e.g., image 502A), the second image (e.g., image 502B), and the third image (e.g., image 502C).

Figure 21:
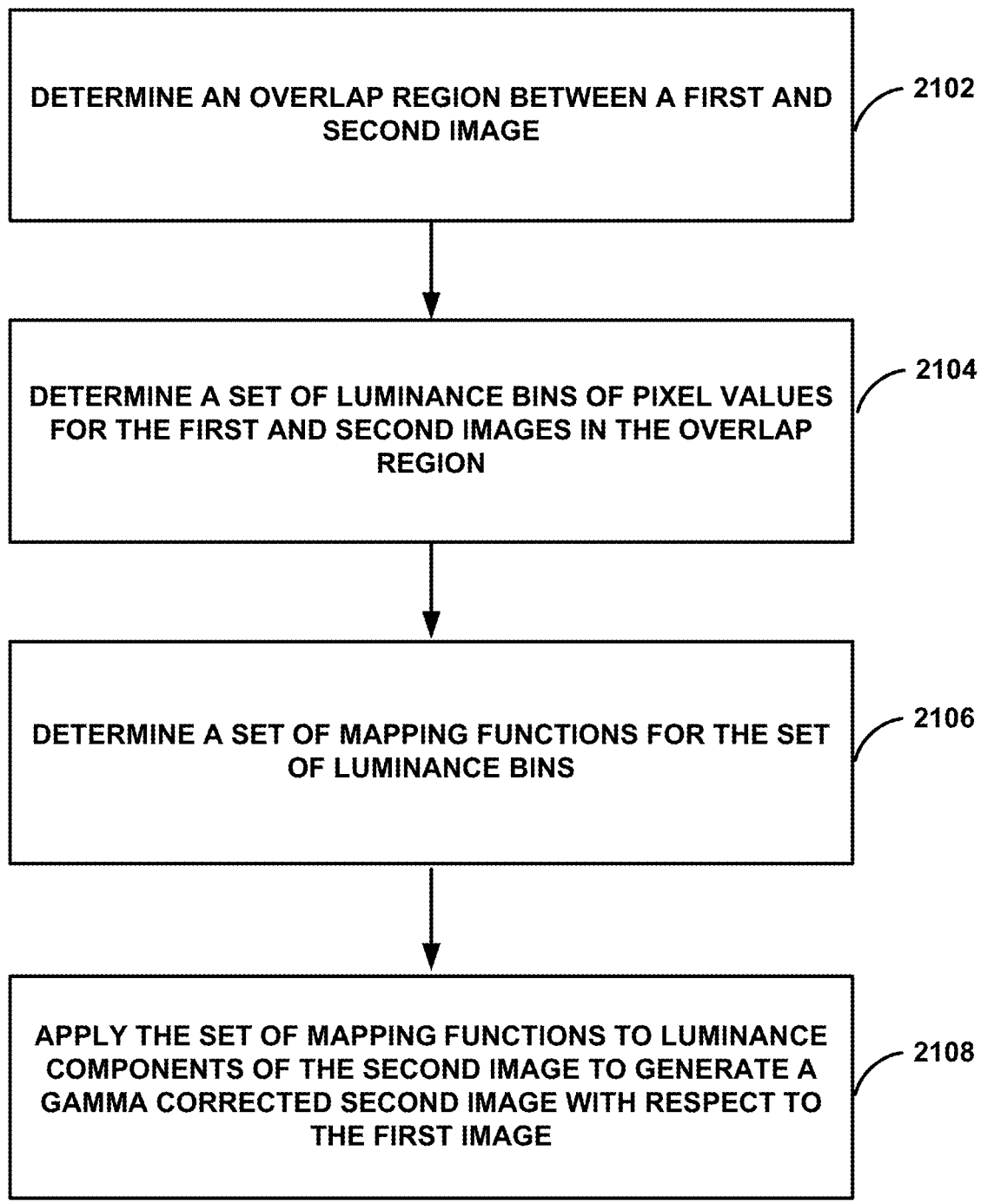
FIG. 21 is a flowchart illustrating an example technique for gamma correcting images of a stitched image in accordance with one or more example techniques described in this disclosure.

FIG. 21 is a flowchart illustrating an example technique for gamma correcting images of a stitched image according to techniques described in this disclosure. FIG. 21 is discussed with respect to computing device 10 of FIG. 1, multi-camera system 200A of FIG. 2A, stitched image 202 of FIG. 2B, stitched image 302 of FIG. 3, and images 502A-D of FIG. 5 for exemplary purposes only.

In operation, multi-camera system 200A may determine an overlap region between a first and second image (2102). For example, multi-camera system 200A may determine that overlap region 504 overlaps images 502A and B. Multi-camera system 200A may determine a set of luminance bins of pixel values for the first and second images in the overlap region (2104). For example, multi-camera system 200A may determine the set of luminance bins of pixel values for the first and second images in the overlap region according to a predefined bin boundary. For instance, multi-camera system 200A may determine the set of luminance bins according to a predefined quantity of luminance bins (e.g., n) such that each luminance bin of the set of luminance bins is equal in size to other luminance bins of the set of bins and spans a predetermined set of pixel values.

Multi-camera system 200A may determine a set of mapping functions for the set of luminance bins (2106). For example, for each luminance bin of the set of luminance bin, multi-camera system 200A may solve a set of linear equations that normalizes a mean luminance value between pixel values from image 502A and 502B that are in a respective luminance bin and positioned in overlap region 504. In the example, multi-camera system 200A may solve the set of linear equations of a respective luminance bin by determining a weighting factor that minimizes an error function for the respective luminance bin. Multi-camera system 200A may apply the set of mapping functions to luminance components of the second image to generate a gamma corrected second image (2108). For example, multi-camera system 200A may apply the weighting factor to pixels corresponding to a respective luminance bin and positioned in image 502B such that the pixels have a luminance value modified by the weighting factor. Multi-camera system 200A may jointly gamma correct any suitable number of images for a stitched image. For example, multi-camera system 200A may jointly gamma correct images 502A-502D to gamma correct stitched image 502.

Figure 22:
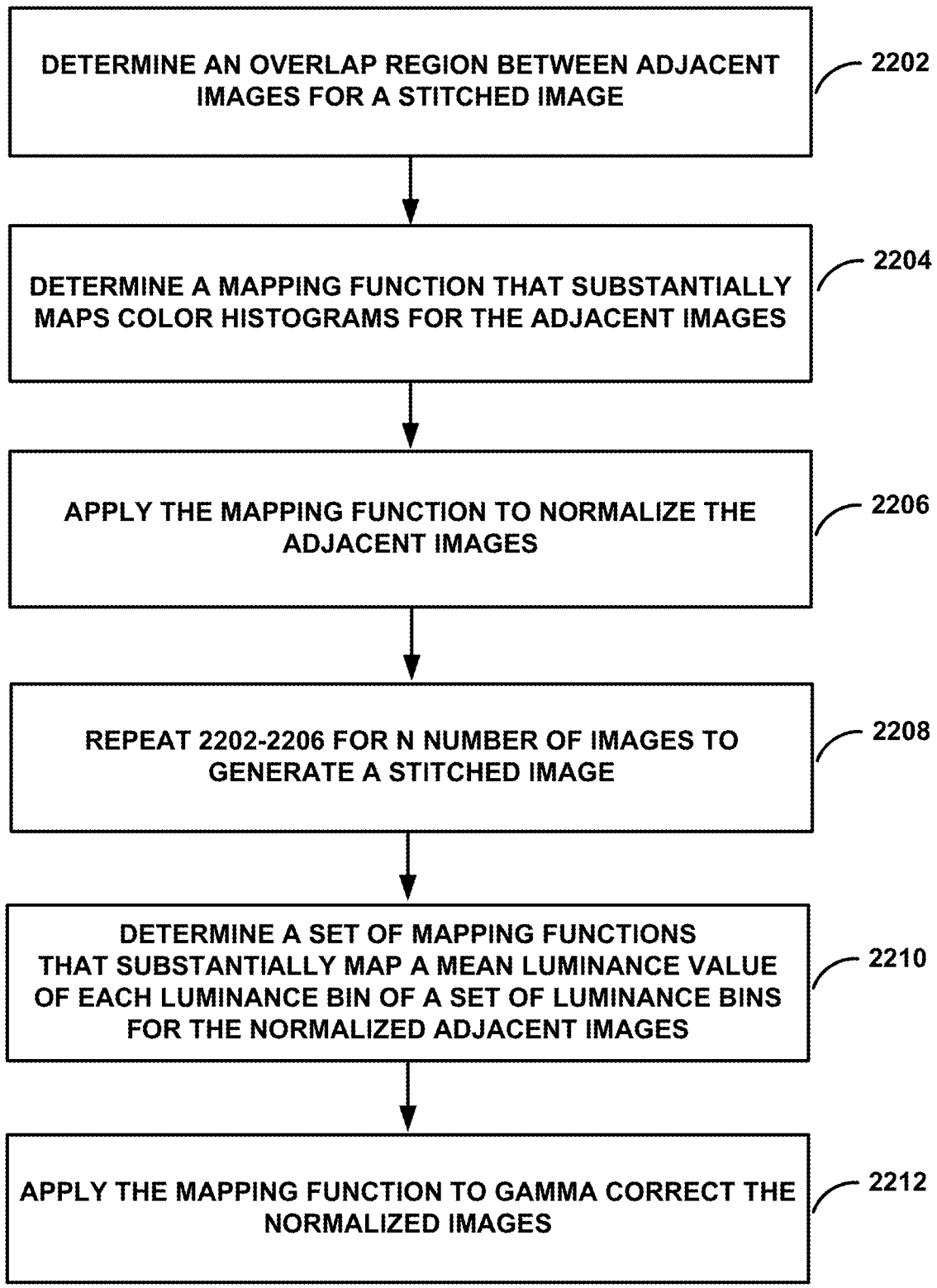
FIG. 22 is a flowchart illustrating a first example technique for normalizing and gamma correcting images of a stitched image in accordance with one or more example techniques described in this disclosure.

FIG. 22 is a flowchart illustrating a first example technique for normalizing and gamma correcting images of a stitched image according to techniques described in this disclosure. FIG. 22 is discussed with respect to computing device 10 of FIG. 1, multi-camera system 200A of FIG. 2A, stitched image 202 of FIG. 2B, stitched image 302 of FIG. 3, images 502A-D of FIG. 5, and pixel values 702-705 of FIG. 7 for exemplary purposes only.

In operation, multi-camera system 200A may determine an overlap region between adjacent images for a stitched image (2202). For example, multi-camera system 200A may determine that overlap region 504 overlaps images 502A and B. Multi-camera system 200A may determine a mapping function that substantially maps the histograms for the adjacent images (2204). For example, multi-camera system 200A may determine a mapping function that modifies each luminance or color values of a histogram for image 502B to have a frequency of a histogram for image 502A. Multi-camera system 200A may apply the mapping function to normalize the adjacent images (2206). For example, with respect to FIG. 7, multi-camera system 200A may set pixels of a second image having pixel value 702 to instead have pixel value 703 of FIG. 7, and similarly, set pixels of the second image having pixel value 704 to instead have pixel value 705.

Multi-camera system 200A may repeat the techniques illustrated in 2202-2206 for N number of images to generate a stitched image (2208). For example, multi-camera system 200A may apply a mapping function to image 502C to generate a normalized image 502C with respect to normalized and gamma corrected image 502B, and so forth.

Multi-camera system 200A may determine a set of mapping functions that substantially map a mean luminance value of each luminance bin of a set of luminance bins for the normalized adjacent images (2210). For example, for each luminance bin of the set of luminance bin, multi-camera system 200A may solve a set of linear equations that normalize a mean luminance value between pixel values from image 502A and 502B that are in a respective luminance bin and positioned in overlap region 504. In the example, multi-camera system 200A may solve the set of linear equations of a respective luminance bin by determining a weighting factor that minimizes an error function for the respective luminance bin. Multi-camera system 200A may apply the set of mapping functions to gamma correct the normalized images (2212). For example, multi-camera system 200A may apply the weighting factor to pixels corresponding to a respective luminance bin and positioned in the normalized image for image 502B such that the pixels have a luminance value modified by the weighting factor.

Figure 23:
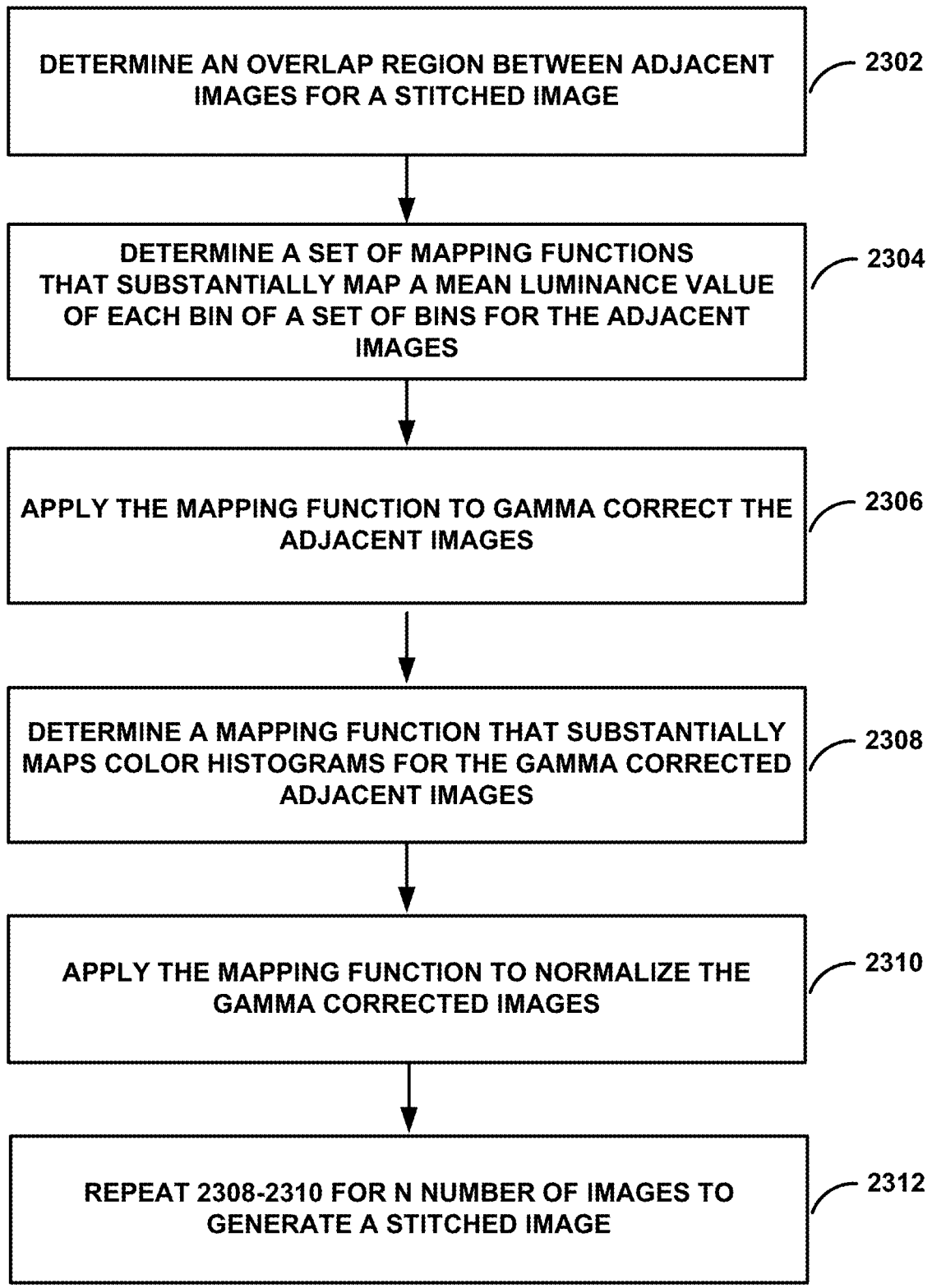
FIG. 23 is a flowchart illustrating a second example technique for normalizing and gamma correcting images of a stitched image in accordance with one or more example techniques described in this disclosure.

FIG. 23 is a flowchart illustrating a second example technique for normalizing and gamma correcting images of a stitched image according to techniques described in this disclosure. FIG. 23 is discussed with respect to computing device 10 of FIG. 1, multi-camera system 200A of FIG. 2A, stitched image 202 of FIG. 2B, stitched image 302 of FIG. 3, images 502A-D of FIG. 5, and pixel values 702-705 of FIG. 7 for exemplary purposes only.

In operation, multi-camera system 200A may determine an overlap region between adjacent images for a stitched image (2302). For example, multi-camera system 200A may determine that overlap region 504 overlaps images 502A and B. Multi-camera system 200A may determine a set of mapping functions that substantially map a mean luminance value of each luminance bin of a set of luminance bins for the normalized adjacent images (2304). For example, for each luminance bin of the set of luminance bin, multi-camera system 200A may solve a set of linear equations that normalize a mean luminance value between pixel values from image 502A and 502B that are in a respective luminance bin and positioned in overlap region 504. In the example, multi-camera system 200A may solve the set of linear equations of a respective luminance bin by determining a weighting factor that minimizes an error function for the respective luminance bin. Multi-camera system 200A may apply the set of mapping functions to gamma correct the adjacent images (2306). For example, multi-camera system 200A may apply the weighting factor to pixels corresponding to a respective luminance bin and positioned in image 502B such that the pixels have a luminance value modified by the weighting factor.

Multi-camera system 200A may determine a mapping function that substantially maps the histograms for the adjacent images (2308). For example, multi-camera system 200A may determine a mapping function that modifies each luminance or color values of a histogram for image 502B to have a frequency of a histogram for image 502A. Multi-camera system 200A may apply the mapping function to normalize the gamma corrected image (2310). For example, with respect to FIG. 7, multi-camera system 200A may set pixels of the gamma corrected image having pixel value 702 to instead have pixel value 703 of FIG. 7, and similarly, set pixels of the gamma corrected image having pixel value 704 to instead have pixel value 705.

Multi-camera system 200A may repeat the techniques illustrated in 2308-2310 for N number of images to generate a stitched image (2312). For example, multi-camera system 200A may apply a mapping function to image 502C to generate a normalized image 502C with respect to normalized and gamma corrected image 502B, and so forth.

In one or more examples, the functions described may be implemented in hardware, software, firmware, or any combination thereof. If implemented in software, the functions may be stored on, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A device comprising a processor comprising integrated circuitry, the processor configured to:
   determine an overlap region between a first image and a second image;
   determine a first histogram based on color data included in the first image that corresponds to the overlap region;
   determine a second histogram based on color data included in the second image that corresponds to the overlap region;
   determine, based on the first and second histograms, a mapping function that maps the second histogram to the first histogram; and
   apply the mapping function to the second image to generate a normalized second image with respect to the first image such that a red-to-green ratio indicated by the normalized second image corresponds to a red-to-green ratio indicated by the second image and such that a blue-to-green ratio indicated by the normalized second image corresponds to a blue-to-green ratio indicated by the second image.

2. The device of claim 1, wherein the processor is further configured to:
   generate a stitched image using the first image and the normalized second image.

3. The device of claim 1, wherein the processor is further configured to:
   smooth the first histogram to generate a first smoothed histogram; and
   smooth the second histogram to generate a second smoothed histogram,
   wherein the processor is further configured to determine the mapping function based on the first and second smoothed histograms.

4. The device of claim 3, wherein:
   to smooth the first histogram, the processor is configured to apply a low pass filter function to the first histogram; and
   to smooth the second histogram, the processor is configured to apply the low pass filter function to the second histogram.

5. The device of claim 1, wherein the processor is further configured to:
   determine, for each pixel of the second image, a correction factor that is based on a distance of a respective pixel from the overlap region,
   wherein the processor is further configured to determine the mapping function based on the correction factor.

6. The device of claim 1, wherein:
   the color data included in the portion of the first image that extends in the overlap region indicates a first luma component;
   the color data included in the portion of the second image that extends in the overlap region indicates a second luma component that is different from the first luma component; and
   to apply the mapping function, the processor is configured to normalize the second luma component to the first luma component using the mapping function.

7. The device of claim 1, wherein the processor is further configured to:
   determine, after applying the mapping function to the second image to generate the normalized second image with respect to the first image, an overlap region between the normalized second image and a third image;

determine a normalized second histogram based on color data included in the normalized second image that corresponds to the overlap region between the normalized second image and a third image;

determine a third histogram based on color data included in the third image that corresponds to the overlap region between the normalized second image and a third image;

determine, based on the normalized second histogram and the third histogram, a second mapping function that maps the third histogram to the normalized second histogram; and apply the mapping function that maps the third histogram to the normalized second histogram to the third image to generate a normalized third image with respect to the normalized second image.

8. The device of claim 1, wherein the processor is further configured to:

determine a set of luminance bins of pixel values for the first image and the second image in the overlap region;

determine a set of mapping functions, wherein each mapping function of the set of mapping functions maps, for a respective luminance bin of the set of luminance bins, a mean luminance value for color data included in the second image that corresponds to the overlap region to a mean luminance value for color data included in the first image that corresponds to the overlap region; and apply the set of mapping functions to luminance components of the second image to generate a gamma corrected second image with respect to the first image.

9. The device of claim 8, wherein the processor is further configured to:

generate a stitched image using the first image and the gamma corrected second image.

10. The device of claim 8, wherein the processor is further configured to:

determine a flat region in a cumulative distribution function (CDF) for the first image, wherein the processor is further configured to determine the set of luminance bins of pixel values for the first image and the second image based on the flat region in the CDF for the first image.

11. The device of claim 8, wherein the processor is further configured to:

apply, before applying the set of mapping functions to the luminance components of the second image, a curve smoothing technique to the set of mapping functions.

12. The device of claim 8, wherein the processor is further configured to:

determine whether a position of a pixel of the first image satisfies a threshold; and in response to determining that the position of the pixel of the first image satisfies the threshold, associate the pixel with a luminance bin of the set of luminance bins, wherein the mapping function for the luminance bin is based on associating the pixel with the luminance bin of the set of luminance bins.

13. The device of claim 8, wherein the processor is further configured to:

determine whether a pixel of the first image is an edge pixel of the first image; and in response to determining that the pixel of the first image is not an edge pixel of the first image, associate the pixel with a luminance bin of the set of luminance bins, wherein the mapping function for the luminance bin is based on associating the pixel with the luminance bin of the set of luminance bins.

14. The device of claim 1, wherein the first histogram indicates a first Y channel in a YCbCr domain for the color data included in the first image that corresponds to the overlap region, and wherein the second histogram indicates a second Y channel in the YCbCr domain for the color data included in the second image that corresponds to the overlap region.

15. The device of claim 1, wherein the processor is further configured to:

determine the color data included in the first image that corresponds to the overlap region based on a subset of pixels of the first image that are positioned in the overlap region; and determine the color data included in the second image that corresponds to the overlap region based on a subset of pixels of the second image that are positioned in the overlap region.

16. The device of claim 1, wherein the processor is further configured to:

apply a first weighting factor to color data included in the first image that corresponds to the overlap region to generate first weighted color data that corresponds to the overlap region;

apply a second weighting factor to color data included in the first image that does not correspond to the overlap region to generate first weighted color data that does not correspond to the overlap region, the second weighting factor being less than the first weighting factor, wherein to determine the first histogram, the processor is configured to determine the first histogram based on the first weighted color data that corresponds to the overlap region and the first weighted color data that does not correspond to the overlap region;

apply a third weighting factor to color data included in the second image that corresponds to the overlap region to generate second weighted color data that corresponds to the overlap region; and apply a fourth weighting factor to color data included in the second image that does not correspond to the overlap region to generate second weighted color data that does not correspond to the overlap region, the fourth weighting factor being less than the third weighting factor, wherein to determine the second histogram, the processor is configured to determine the second histogram based on the second weighted color data that corresponds to the overlap region and the second weighted color data that does not correspond to the overlap region.

17. A method comprising:

determining an overlap region between a first image and a second image;

determining a first histogram based on color data included in the first image that corresponds to the overlap region;

determining a second histogram based on color data included in the second image that corresponds to the overlap region;

determining, based on the first and second histograms, a mapping function that maps the second histogram to the first histogram; and applying the mapping function to the second image to generate a normalized second image with respect to the first image such that a red-to-green ratio indicated by the normalized second image corresponds to a red-togreen ratio indicated by the second image and such that a blue-to-green ratio indicated by the normalized second image corresponds to a blue-to-green ratio indicated by the second image.

18. The method of claim 17, further comprising:
generating a stitched image using the first image and the normalized second image.

19. A non-transitory computer-readable storage medium storing instructions that when executed cause one or more processors to:
determine an overlap region between a first image and a second image;
determine a first histogram based on color data included in the first image that corresponds to the overlap region;
determine a second histogram based on color data included in the second image that corresponds to the overlap region;
determine, based on the first and second histograms, a mapping function that maps the second histogram to the first histogram; and
apply the mapping function to the second image to generate a normalized second image with respect to the first image such that a red-to-green ratio indicated by the normalized second image corresponds to a red-to-green ratio indicated by the second image and such that a blue-to-green ratio indicated by the normalized second image corresponds to a blue-to-green ratio indicated by the second image.

* * * * *